(12) United States Patent
Ohtsu et al.

(10) Patent No.: US 11,682,374 B2
(45) Date of Patent: Jun. 20, 2023

(54) SOUNDPROOF STRUCTURE BODY

(71) Applicant: FUJIFILM Corporation, Tokyo (JP)

(72) Inventors: Akihiko Ohtsu, Ashigarakami-gun (JP);
Shinya Hakuta, Ashigarakami-gun (JP); Shogo Yamazoe, Ashigarakami-gun (JP); Yoshihiro Sugawara, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 626 days.

(21) Appl. No.: 16/838,497

(22) Filed: Apr. 2, 2020

(65) Prior Publication Data

US 2020/0234687 A1    Jul. 23, 2020

Related U.S. Application Data

(63) Continuation of application No. PCT/JP2018/036837, filed on Oct. 2, 2018.

(30) Foreign Application Priority Data

Oct. 3, 2017    (JP) .............................. JP2017-193291

(51) Int. Cl.
*G10K 11/172*    (2006.01)
*F24F 13/24*    (2006.01)
*G10K 11/168*    (2006.01)

(52) U.S. Cl.
CPC ............ *G10K 11/172* (2013.01); *F24F 13/24* (2013.01); *G10K 11/168* (2013.01); *F24F 2013/245* (2013.01)

(58) Field of Classification Search
CPC ..... G10K 11/172; G10K 11/168; F24F 13/24; F24F 2013/245
See application file for complete search history.

(56) References Cited

U.S. PATENT DOCUMENTS 5,449,499 A  *  9/1995  Bauer ................ B01D 53/8631
                                                    422/177
10,876,504 B2 * 12/2020  Shirakawa ......... B60H 1/00564
                        (Continued)

FOREIGN PATENT DOCUMENTS

CN      102087852 A    6/2011
CN      102378082 A    3/2012
                (Continued)

OTHER PUBLICATIONS

International Preliminary Report on Patentability, dated Aug. 19, 2019, for International Application No. PCT/JP2018/036837, with an English translation.
(Continued)

*Primary Examiner* — Forrest M Phillips
(74) *Attorney, Agent, or Firm* — Birch, Stewart, Kolasch & Birch, LLP

(57) ABSTRACT

A soundproof structure body includes a first tube structure and a second tube structure connected to the first tube structure and having a cross-sectional area different from the first tube structure, in which a structure body having a cross-sectional area smaller than a cross-sectional area of the first tube structure is installed in the first tube structure, and a transmission loss in a case where the structure body is installed in the first tube structure with respect to a case where the structure body is not installed in the first tube structure is positive at two frequencies adjacent to each other and difficult to generate an air column resonance mode in the first tube structure. This soundproof structure body generates a soundproof effect even at frequencies other than air column resonance of a tube structure such as a duct or a muffler, has a small size, and can obtain a high transmission loss in a wide-band.

17 Claims, 11 Drawing Sheets

(56) References Cited

U.S. PATENT DOCUMENTS

| | | | |
|---|---|---|---|
| 11,519,167 B2* | 12/2022 | Blades | E04B 1/8409 |
| 2005/0126850 A1 | 6/2005 | Yamaguchi et al. | |
| 2007/0205044 A1* | 9/2007 | Bae | F01N 1/02 |
| | | | 181/255 |
| 2011/0127107 A1 | 6/2011 | Tanase et al. | |
| 2012/0057736 A1 | 3/2012 | Shiozawa et al. | |
| 2016/0334131 A1* | 11/2016 | Hasegawa | F24F 13/24 |
| 2019/0115003 A1* | 4/2019 | Kadotani | G10K 11/162 |

FOREIGN PATENT DOCUMENTS

| | | |
|---|---|---|
| CN | 104616647 A | 5/2015 |
| EP | 2 328 141 A2 | 6/2011 |
| JP | 2000-205486 A | 7/2000 |
| JP | 2005-171933 A | 6/2005 |
| JP | 2015-72360 A | 4/2015 |
| JP | 2016-133226 A | 7/2016 |
| JP | 2016-170194 A | 9/2016 |

OTHER PUBLICATIONS

International Search Report, dated Dec. 4, 2018, for International Application No. PCT/JP2018/036837, with an English translation.
Extended European Search Report, dated Oct. 21, 2020, for European Application No. 18865116.0.
Chinese Office Action and Search Report for Chinese Application No. 201880064317.8, dated Feb. 7, 2023, with an English translation.

* cited by examiner

SOUNDPROOF STRUCTURE BODY

CROSS-REFERENCE TO RELATED APPLICATIONS

This application is a Continuation of PCT International Application No. PCT/JP2018/036837 filed on Oct. 2, 2018, which claims priority under 35 U.S.C. § 119(a) to Japanese Patent Application No. 2017-193291 filed on Oct. 3, 2017. The above application is hereby expressly incorporated by reference, in its entirety, into the present application.

BACKGROUND OF THE INVENTION

1. Field of the Invention

The present invention relates to a soundproof structure body including a tube structure and a structure body. Specifically, the present invention relates to a soundproof structure body for reducing sound to perform soundproofing in a wide frequency band while maintaining air permeability in a tube structure having air permeability such as a duct, a muffler, and a ventilation sleeve.

2. Description of the Related Art

In the related art, since structures such as the duct, the muffler, and the ventilation sleeve, which are based on the premise that air permeability is secured, allow even sound to pass together with gas, wind, or heat, noise countermeasures may be required. Therefore, in order to apply the structures such as a duct and a muffler to be attached to a particularly noisy machine, it is necessary to soundproof by devising the structures of the duct and the muffler (see JP2005-171933A and JP2016-170194A).

The technology disclosed in JP2005-171933A relates to an exhaust muffling device including an expansion type exhaust muffling device, and lengths of an expansion chamber and an outlet pipe included in a muffler is defined. In the technology, there is a relationship of L=2nL2 between a length L of the expansion chamber and a length L2 of the outlet pipe. This technology is a technology that in air column resonance defined by the outlet pipe, the length of the expansion chamber is set to the relationship, so that sound with a frequency of the outlet pipe at which air column resonance is generated is effectively suppressed by an interference effect.

JP2016-170194A discloses a sound absorbing structure in which a sound absorbing body having a resonance structure with a vibration plate is installed in a duct. In the technology disclosed in JP2016-170194A, the highest sound absorption coefficient is obtained at a sound absorption peak frequency at which the vibration plate resonates. Therefore, according to the technology disclosed in JP2016-170194A, the sound absorption peak frequency of the sound absorbing body can be adjusted in accordance with a noise frequency band of the sound incident into the duct. In addition, in this technology, in a case where a noise frequency of the sound incident into the duct passes over a plurality of frequency bands, a plurality of sound absorbing bodies are installed in the duct depending on the plurality of frequency bands.

SUMMARY OF THE INVENTION

In the technology disclosed in JP2005-171933A, a high soundproof effect is limitedly generated at the near-resonance frequency of the outlet pipe. Therefore, there was a problem that in a case where the soundproof effect is required in a wide frequency band, the technology cannot be applied.

In addition, the technology disclosed in JP2016-170194A is based on the premise that sound is absorbed by resonance of the vibration plate of the sound absorbing body, and there are no mentions that a mode of the duct and soundproofing for the sound having a frequency other than the resonance frequency of the sound absorbing body. Therefore, this technology requires a large number of sound absorbing bodies in a case where the soundproof effect in the wide frequency band is required. However, this technology has a problem that it is often difficult to install a large number of sound absorbing members in the duct due to a space limitation, and there was a problem that even in a case where there is no space limitation, the installation of a large number of sound absorbing bodies in the duct causes air permeability to be deteriorated and a size of the sound absorbing structure to be enlarged.

In general, in order to obtain a high transmission loss at a desired frequency, it is considered as one countermeasure that a resonance type soundproof structure body (for example, a Helmholtz resonator, an air column resonance cylinder, or a film vibration type structure body) is provided to perform soundproofing for the resonance frequency as disclosed in JP2005-171933A and JP2016-170194A.

The resonance type soundproof structure body is effective for a specific frequency, but a resonance type soundproof structure body is not effective in a case of realizing soundproofing in a wide-band. As described above, there was a problem that in order to realize the wide-band soundproofing in the resonance type soundproof structure body, a large number of structure bodies having different resonance frequencies to each other are necessary to be installed.

On the other hand, sound absorbing materials may have an effect on the soundproofing in the wide-band. The sound absorbing materials such as urethane and glass wool are effective for high-frequency sound, but are not effective for eliminating low-frequency sound of, for example, 2 kHz or less in the wide-band. In addition, in a case of using the sound absorbing material, since a sound absorbing performance depends on a volume thereof, it is necessary to use a larger number of sound absorbing materials in order to improve the sound absorbing performance, but which may not be preferable from the viewpoint of securing air permeability.

Generally, in a case where the low-frequency sound is absorbed based on the resonance phenomenon, since the wavelength is long, a size of the soundproof structure corresponding to a wavelength is increased. The above problem caused a disadvantage that the air permeability of the duct or the muffler is reduced.

The present invention is to solve the above described problems of the related art, and an object is to provide a soundproof structure body generating a soundproof effect even at frequencies other than air column resonance of a tube structure such as a duct or a muffler, having a small size, and capable of obtaining a high transmission loss in a wide-band.

Furthermore, in addition to the above object, an object of the present invention is to provide a soundproof structure body including a tube structure formed of a plurality of cross-sectional areas, in which the soundproof structure body can obtain a soundproof effect in a wide-band by designing the cross-sectional area of the tube structure, and a length and position of a structure body installed in the tube structure appropriately to reduce a transmitted wave in the wide-band.

Here, in the present invention, "soundproofing" includes both means of "sound insulation" and "sound absorption" as acoustic characteristics, and particularly refers to "sound insulation". Furthermore, "sound insulation" refers to "shielding sound". That is, "sound insulation" refers to "not transmitting sound". Therefore, "sound insulation" includes "reflecting" sound (acoustic reflection) and "absorbing" sound (acoustic absorption) (refer to Sanseido Daijirin (Third Edition), and http://www.onzai.or.jp/question/sound-proof.html and http://www.onzai.or.jp/pdf/new/gijutsu201312_3.pdf of web pages of Japan Society for Acoustic Materials Science).

Hereinafter, basically, "sound insulation" and "shielding" are referred to in a case where "reflection" and "absorption" are not distinguished from each other, and "reflection" and "absorption" are referred to in a case where "reflection" and "absorption" are distinguished from each other.

In order to achieve the above objects, a soundproof structure body of the present invention comprises: a first tube structure; and a second tube structure connected to the first tube structure and having a cross-sectional area different from the first tube structure, in which a direction from the second tube structure toward the first tube structure is set to a waveguide forward direction, a structure body having a cross-sectional area smaller than a cross-sectional area of the first tube structure is installed in the first tube structure, and assuming that there are three or more consecutive frequencies forming a stable air column resonance mode in the first tube structure, three consecutive frequencies of the three or more consecutive frequencies are denoted by $f_i$, $f_{i+1}$, and $f_{i+2}$, where i is integer, an intermediate frequency between first two adjacent frequencies $f_i$ and $f_{i+1}$ is denoted by $f_n$, where n is integer, an intermediate frequency between next two adjacent frequencies $f_{i+1}$ and $f_{i+2}$ is denoted by $f_{n+1}$, a transmission loss in a case where the structure body is installed in the first tube structure with respect to a case where the structure body is not installed in the first tube structure is positive at the frequencies $f_n$ and $f_{n+1}$.

Here, a cross-sectional area of the second tube structure is smaller than the cross-sectional area of the first tube structure, and assuming that a length of the first tube structure is denoted by L, a cross-sectional area of the first tube structure is denoted by $S_1$, a cross-sectional area of an outlet-side space of the first tube structure in the waveguide forward direction is denoted by $S_{out}$, a length of the structure body is denoted by d, a cross-sectional area of a surface perpendicular to the waveguide forward direction is denoted by $S_2$, and a distance from an outlet-side opening end of the first tube structure in the waveguide forward direction to an installation position of the structure body is denoted by p, assuming that in a bonding portion side between the first tube structure and the second tube structure, a cross-sectional area of a surface that reflects a sound wave traveling in a direction opposite to the waveguide forward direction of the first tube structure and that is perpendicular to the waveguide forward direction is denoted by $S_d$, a sound velocity is denoted by c, and n is integer, and assuming that a frequency f at which the length L of the first tube structure corresponds to $L=n\lambda/2$ is denoted by $f_n$, and $f_n=nc/2L$, a frequency at which the following Expression (1) is satisfied may exist.

$$X(f_n)>1 \text{ AND } X(f_{n+1})>1 \quad (1)$$

Where, X(f) is represented by the following Expressions (2) to (4).

$$X(f) = \frac{\left|A(f) + \frac{S_{out}B(f)}{\rho c} + \frac{\rho c C(f)}{S_1 - S_d + dS} + \frac{S_{out}}{S_1 - S_d + dS}D(f)\right|^2}{\left|A_0(f) + \frac{S_{out}B_0(f)}{\rho c} + \frac{\rho c C_0(f)}{S_1 - S_d + dS} + \frac{S_{out}}{S_1 - S_d + dS}D_0(f)\right|^2} \quad (2)$$

$$\begin{bmatrix} A_0(f) & B_0(f) \\ C_0(f) & D_0(f) \end{bmatrix} = T_0 \quad (3)$$

$$T_0 = \begin{bmatrix} \cos kL & j\frac{\rho c}{S_1}\sin kL \\ j\frac{S_1}{\rho c}\sin kL & \cos kL \end{bmatrix}$$

$$\begin{bmatrix} A(f) & B(f) \\ C(f) & D(f) \end{bmatrix} = T_1 T_2 T_3 \quad (4)$$

$$T_1 = \begin{bmatrix} \cos k(L-d-p) & j\frac{\rho c}{S_1}\sin k(L-d-p) \\ j\frac{S_1}{\rho c}\sin k(L-d-p) & \cos k(L-d-p) \end{bmatrix}$$

$$T_2 = \begin{bmatrix} \cos kd & j\frac{\rho c}{S_1 - S_2}\sin kd \\ j\frac{S_1 - S_2}{\rho c}\sin kd & \cos kd \end{bmatrix}$$

$$T_3 = \begin{bmatrix} \cos kp & j\frac{\rho c}{S_1}\sin kp \\ j\frac{S_1}{\rho c}\sin kp & \cos kp \end{bmatrix}$$

Where, dS is $0.01 \times S_1$.

Where, $\rho$ is air density, k is $2\pi f/c$ in terms of the wave number, and j represents an imaginary number.

In addition, assuming that a longest line segment length of line segments constituting an outer edge of the cross-section on an end of the first tube structure is denoted by a, the frequency $f_{n+1}$ at which the length L of the first tube structure corresponds to $L=(n+1)\lambda/2$ may satisfy $f_{n+1}<c/a$.

Furthermore, it is preferable that the following Expression (5) is satisfied.

$$X(f_{n+2})>1 \quad (5)$$

Assuming that the transmission loss is denoted by TL, TL is represented by the following Expression (6).

$$TL=10 \log_{10}(X(f)) \quad (6)$$

Furthermore, a ratio $S_{out}/S_1$ of the cross-sectional area $S_{out}$ of the outlet-side space to the cross-sectional area $S_1$ of the first tube structure is preferably greater than 10.

Preferably, the second tube structure is connected to the end of the first tube structure.

Preferably, the first tube structure and the second tube structure are connected to each other at a right angle.

Preferably, the outlet-side space of the first tube structure in the waveguide forward direction is an open space.

Preferably, the structure body is a resonator for a sound wave.

Preferably, the resonator is an air column resonance cylinder, a Helmholtz resonator, or a film vibration type structure body.

According to the present invention, the soundproof structure body generates a soundproof effect even at frequencies other than air column resonance of a tube structure such as a duct or a muffler, has a small size, and can obtain a high transmission loss in a wide-band.

Furthermore, according to the present invention, a soundproof structure body includes a tube structure formed of a plurality of cross-sectional areas, in which the soundproof structure body can obtain a soundproof effect in a wide-band by designing the cross-sectional area of the tube structure, and a length and position of a structure body installed in the tube structure appropriately to reduce a transmitted wave in the wide-band.

DESCRIPTION OF THE PREFERRED EMBODIMENTS

Hereinafter, a soundproof structure body according to the present invention will be described in detail.

The soundproof structure body of the present invention includes: a first tube structure; and a second tube structure connected to the first tube structure and having a cross-sectional area different from the first tube structure, in which a direction from the second tube structure toward the first tube structure is set to a waveguide forward direction, a structure body having a cross-sectional area smaller than a cross-sectional area of the first tube structure is installed in the first tube structure, and assuming that there are three or more consecutive frequencies forming a stable air column resonance mode in the first tube structure, three consecutive frequencies of the three or more consecutive frequencies are denoted by $f_i$, $f_{i+1}$, and $f_{i+2}$, where i is integer, an intermediate frequency between first two adjacent frequencies fi and $f_{i+1}$ is denoted by $f_n$ where n is integer, an intermediate frequency between next two adjacent frequencies $f_{i+1}$ and $f_{i+2}$ is denoted by $f_{n+1}$, a transmission loss in a case where the structure body is installed in the first tube structure with respect to a case where the structure body is not installed in the first tube structure is positive at the frequencies $f_n$ and $f_{n+1}$.

Hereinafter, the soundproof structure body according to the present invention will be described in detail with reference to suitable embodiments shown in the accompanying drawings.

Hereinafter, a description will be given as a typical example, in which a bending tube structure body in which two first tube structure and second tube structure are connected to each other at a right angle, is used and a structure body is disposed in the first tube structure, but the present invention is not limited thereto.

Figure 1:
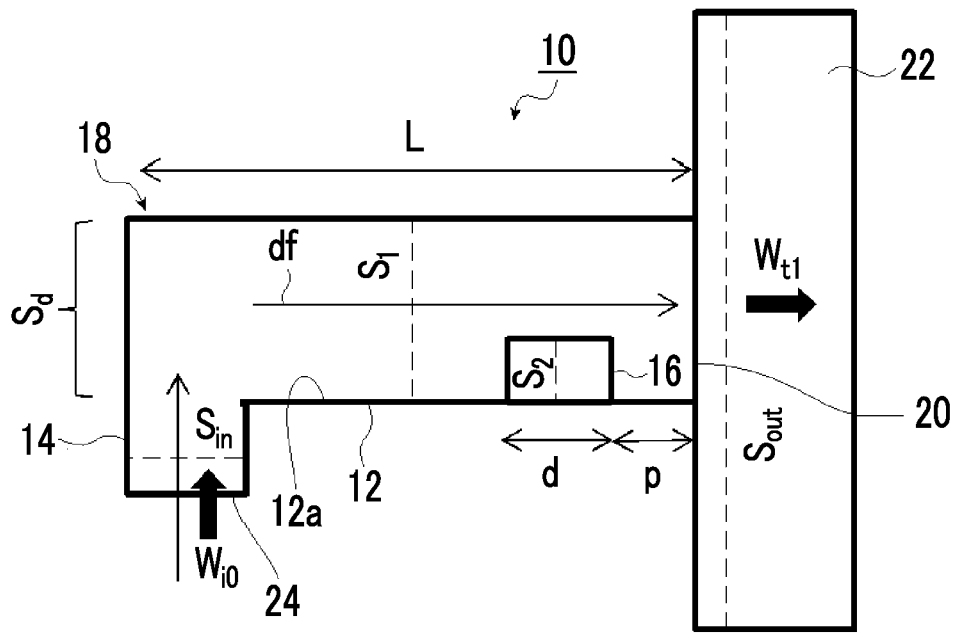
FIG. 1 is a schematic cross-sectional view showing an example of a soundproof structure body according to an embodiment of the present invention.
Figure 2:
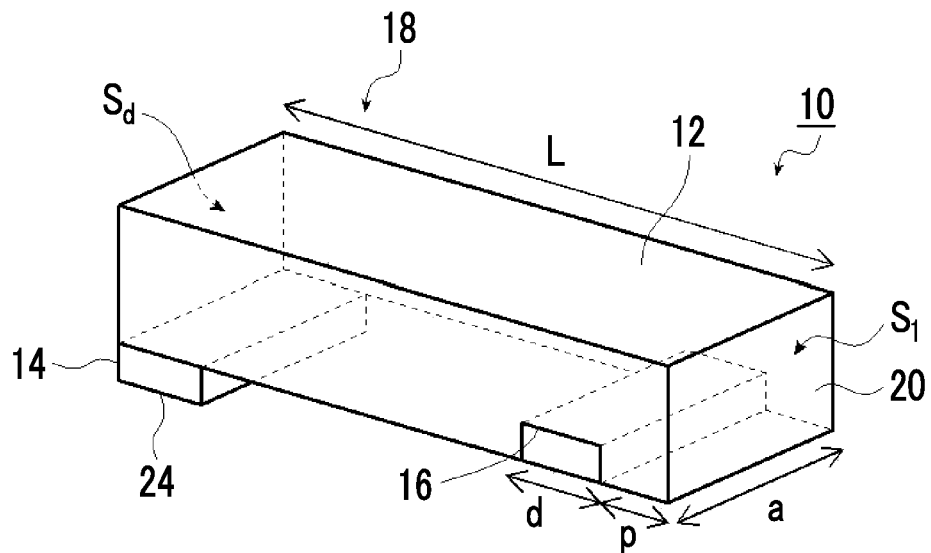
FIG. 2 is a schematic perspective view of the soundproof structure body shown in FIG. 1.

FIG. 1 is a cross-sectional view schematically showing an example of a soundproof structure body according to an embodiment of the present invention. FIG. 2 is a schematic perspective view of the soundproof structure body shown in FIG. 1.

(Soundproof Structure Body)

A soundproof structure body 10 according to an embodiment of the present invention shown in FIGS. 1 and 2 includes a first tube structure 12 having a rectangular cross-section, a second tube structure 14 having a rectangular cross-section connected to the first tube structure 12, and a structure body 16 installed inside the first tube structure 12. Here, the second tube structure 14 has a different cross-sectional area from the first tube structure 12. A cross-sectional area $S_{in}$ of the second tube structure 14 is preferably smaller than a cross-sectional area $S_1$ of the first tube structure, as shown in FIGS. 1 and 2. The cross-sectional area $S_{in}$ of the second tube structure 14 may be smaller than the cross-sectional area $S_1$ of the first tube structure, and is not particularly limited as long as the cross-sectional area $S_{in}$ may be at least 10%.

In addition, since the structure body 16 is installed inside the first tube structure 12, a cross-sectional area $S_2$ of the structure body 16 is smaller than the cross-sectional area $S_1$ of the first tube structure 12.

The second tube structure 14 is connected at a right angle to one end of the first tube structure 12. As a result, the first tube structure 12 and the second tube structure 14 constitute a bending tube structure body 18 such as a duct of a muffler having a bending structure. In FIGS. 1 and 2, the first tube structure 12 has a length L as a tube and constitutes a straight tube portion of the tube structure body 18. On the other hand, the second tube structure 14 constitutes a bending portion of the tube structure body 18 bent from the straight tube portion. In the present invention, the term "bending" is not limited to a bending angle of π/2(90°) as shown in FIG. 1, and the bending portion may have a bending angle of 5° or greater.

In the tube structure body 18, one end of the first tube structure 12 is connected to the second tube structure 14, and the other end constitutes an opening end 20. The opening end 20 is connected to an outlet-side space 22 having a cross-sectional area $S_{out}$. One end of the second tube structure 14 is connected to the one end of the first tube structure 12, and the other end constitutes an opening end 24.

In the present invention, a sound wave is radiated from the opening end 20 of the first tube structure 12 to the outlet-side space 22, the first tube structure 12 of the soundproof structure body 10 according to an embodiment of the present invention forms, for example, a duct or a muffler, and the outlet-side space 22 can be an internal space serving as an outlet of the duct or the muffler, or an external space. Therefore, in the present invention, the outlet-side space 22 is preferably a space greater than the space formed by the opening end 20 of the first tube structure 12, and more preferably an open space. For example, a ratio $S_{out}/S_1$ of the cross-sectional area $S_{out}$ of the outlet-side space 22 to the cross-sectional area $S_1$ of the first tube structure 12 is preferably greater than 10. In a case where the outlet-side space 22 is the open space, the ratio $S_{out}/S_1$ of the cross-sectional area $S_{out}$ of the outlet-side space 22 to the cross-sectional area $S_1$ of the first tube structure 12 may be 10000 or more.

In the present invention, as described above, the first tube structure 12 and the second tube structure 14 of the tube structure body 18 may be connected to each other separately or may be integrated. That is, the tube structure body 18 may be integrally formed.

In the soundproof structure body 10 according to the embodiment of the present invention, a direction from the second tube structure 14 of the tube structure body 18 toward the first tube structure 12 is defined as a forward direction df of a waveguide.

The tube structure body 18 resonates at a specific frequency and functions as an air column resonator.

The structure body 16 is disposed inside the first tube structure 12 of the tube structure body 18 and on a bottom surface 12a of the first tube structure 12. The structure body 16 has a rectangular parallelepiped. The structure body 16 changes an cross-sectional area of an internal space of the first tube structure 12. In the example shown in FIG. 1, a length of the structure body 16 in the forward direction df of a waveguide is d. The structure body 16 is disposed at a position spaced by a distance p from the opening end 20 of the first tube structure 12 into the first tube structure 12 in a direction opposite to the forward direction df of a waveguide.

In a pipe line such as the tube structure body 18 of the soundproof structure body 10 according to the embodiment of the present invention, the sound wave is reflected at an interface having a different pipe line cross-section. Therefore, in the present invention, the structure body 16 is disposed at an appropriate position inside the first tube structure 12 of the tube structure body 18 (for example, a position spaced by a distance p from the opening end 20 in the example shown in FIG. 1), so that interference of the reflection wave with respect to the sound wave traveling in the forward direction df of a waveguide is appropriately controlled. As a result, it is possible to realize soundproofing in a wide-band.

The structure body 16 may be a resonator for a sound wave or a structure body having an opening portion as long as the structure body can generate a reflection wave with respect to the sound wave traveling in the forward direction df of a waveguide and can realize soundproofing in the wide-band by the interference of the reflection wave.

(Soundproof Principle of Soundproof Structure Body)

Figure 3:
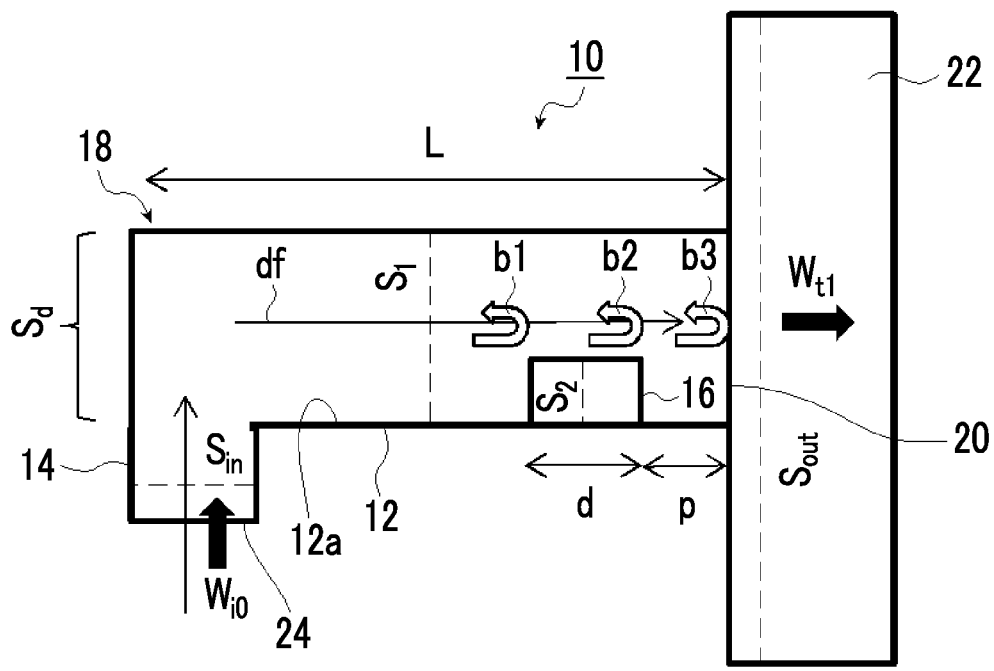
FIG. 3 is an explanatory diagram showing a soundproof principle of the soundproof structure body shown in FIG. 1.

As shown in FIG. 3, by disposing the structure body 16 of the first tube structure 12 of the tube structure body 18 of the soundproof structure body 10, the cross-sectional area of the internal space of the first tube structure 12 changes at one end (the left end in FIG. 3) of the structure body 16 and the other end (the right end in FIG. 3) of the structure body 16 with respect to the forward direction df of a waveguide. In this case, since both end surfaces form an interface configured by pipe line cross-sections different from each other, impedance for the sound changes at the interface, a sound wave traveling in the forward direction df of a waveguide is reflected, and as a result, reflection waves b1 and b2 are generated.

In addition, at the opening end 20 of the first tube structure 12, the cross-sectional area $S_1$ of the first tube structure 12 changes to the cross-sectional area $S_{out}$ of the outlet-side space 22. As described above, in a case where the cross-sectional area of the pipe line changes, the sound wave traveling in the forward direction df of a waveguide is reflected at the opening end 20 that is an interface, and as a result, a reflection wave b3 is generated.

Therefore, in a case where the generated reflection waves b1, b2, and b3 interfere with each other in a strengthening manner, the sound waves radiated from the opening end 20 of the first tube structure 12 to the outlet-side space 22 decrease. As a result, the soundproof structure body 10 according to the embodiment of the present invention can perform soundproofing incident sound.

Figure 4:
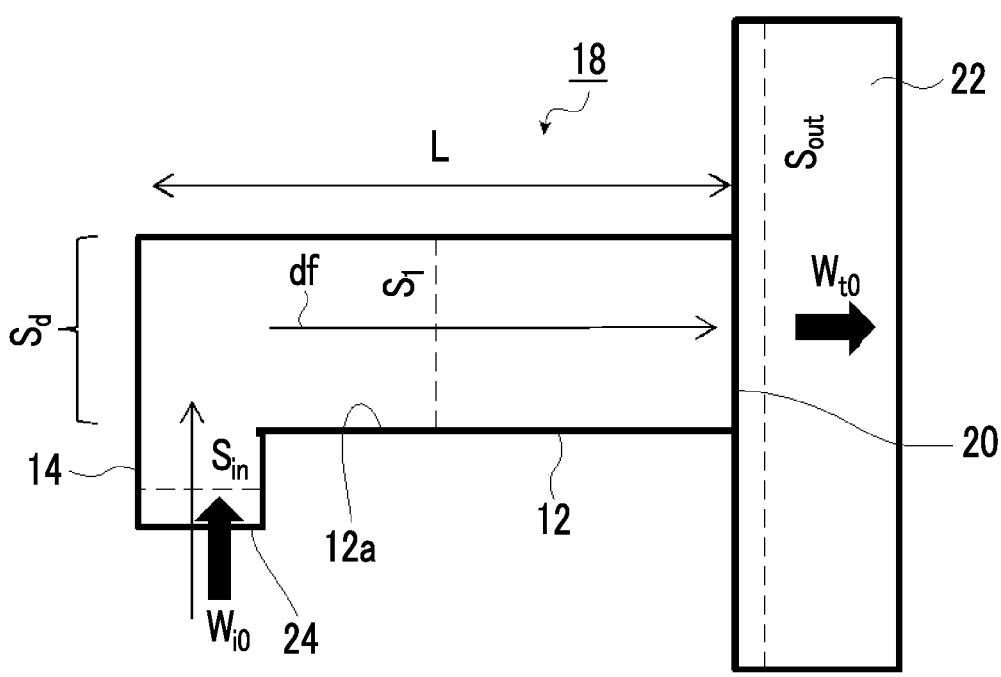
FIG. 4 is a schematic cross-sectional view of the soundproof structure body in which two tube structures are connected to each other at a right angle for explaining the soundproof principle of the present invention.

In order to explain the soundproof principle of the soundproof structure body 10 according to the embodiment of the present invention, first, the acoustic characteristics of the first tube structure 12 alone, in which no structure body is disposed as the tube structure body 18 shown in FIG. 4, are explained.

In the tube structure body 18 shown in FIG. 4, the first tube structure 12 behaves as an air column resonance tube due to a tube length L.

For example, at a frequency at which the tube length L satisfies L=(2n+1) λ/4 (λ is a wavelength of sound and n is an integer), λ/4 air column resonance is generated, so that a loud sound is radiated to the outlet-side space 22.

The sound at this frequency forms a stable resonance mode in the first tube structure 12. Therefore, in a case where a structure body serving as an obstacle in the first tube structure 12 such as the soundproof structure body 10 according to the embodiment of the present invention is installed, in most cases, the formed stable resonance mode is disturbed, so that the sound can be reduced by installing the structure body at any position (for example, an appropriate position).

However, at a frequency where such an air column resonance mode is least likely to be generated, for example, at a frequency where the tube length L corresponds to L=nλ/2 or in a peripheral frequency region, the resonance (formation of the mode) does not occur.

In this frequency $f_n$ (=nc/(2L)) (c is a sound velocity (m/s)), or in this frequency region, due to no occurrence of the resonance, even though the structure body is installed at any position (for example, an appropriate position), sound radiated to the outlet-side space cannot be reliably reduced (this is because no mode is formed in the first place). For example, at such a frequency $f_n$, the sound radiated to the outlet-side space 22 may be amplified and increased, or may be reduced and decreased. Therefore, in the soundproof structure body 10 according to the embodiment of the present invention, it is required that a size of the structure body 16 and a position where the structure body 16 is disposed are appropriately designed.

Figure 5:
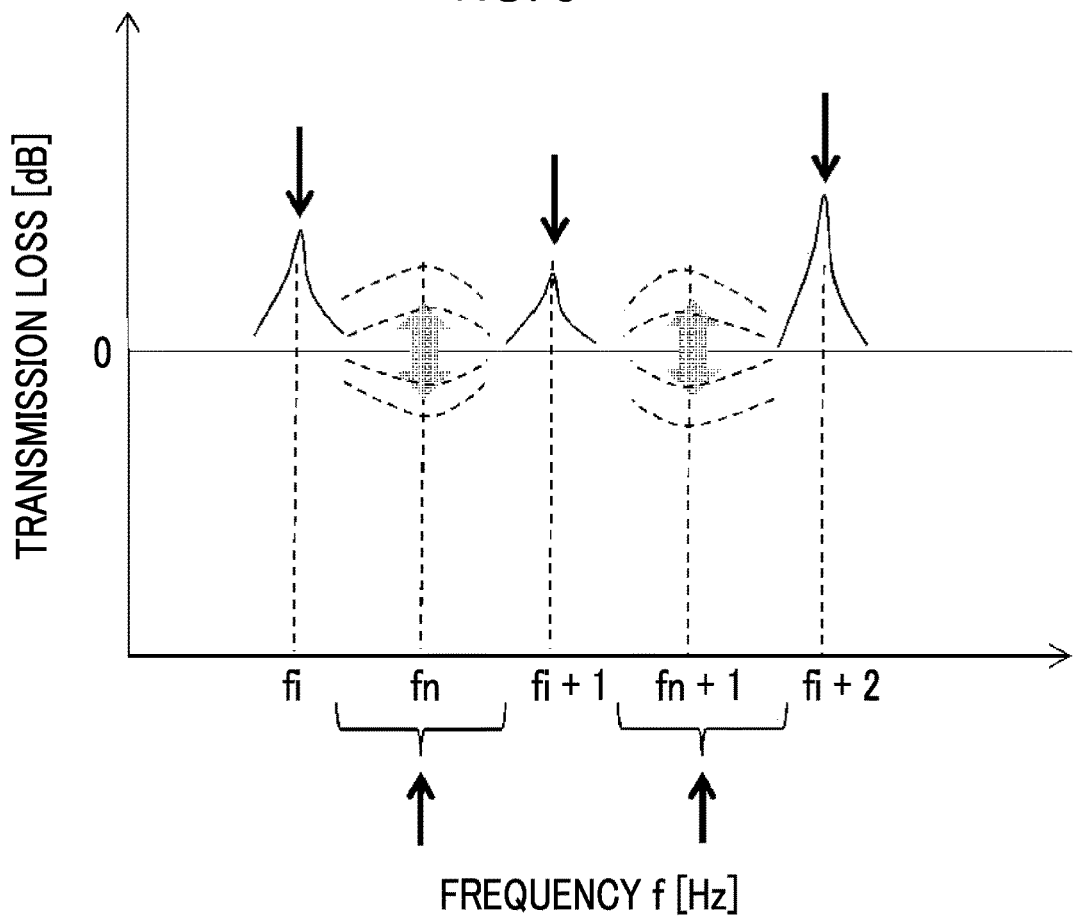
FIG. 5 is a graph showing a relationship between a sound frequency and a transmission loss for explaining the soundproof principle in the soundproof structure body of the present invention.

For example, FIG. 5 is a diagram showing a concept of the transmission loss in a case where a structure body serving as an obstacle is disposed inside the first tube structure 12 of the tube structure body 18 shown in FIG. 4. That is, a graph showing a relationship between a sound frequency and a transmission loss for explaining the soundproof principle in the soundproof structure body of the present invention is shown in FIG. 5.

As shown in FIG. 5, at a frequency $f_i$ where the tube length L of the first tube structure 12 satisfies $L=(2i+1)\lambda/4$ (i is an integer), as described above, $(2i+1)\lambda/4$ resonance (so-called $\lambda/4$ resonance) is generated, so that a stable resonance mode is disturbed by disposing the structure body inside the first tube structure 12, and as a result, the transmission loss increases. Here, since the sound wavelength $\lambda$ is represented by $\lambda=4L/(2i+1)$, the frequency $f_i$ is represented by $f_i=(2i+1)c/(4L)$. Where, c represents the sound velocity. $f_{i+1}=(2(i+1)+1)c/(4L)=(2i+3)c/(4L)$ is represented, and $f_{i+2}=(2(i+2)+1)c/(4L)=(2i+5)c/(4L)$ is represented.

However, as shown in FIG. 5, since formation of the resonance mode does not occur at the frequency in the peripheral region including the frequency $f_n$ ($=nc/(2L)$) where the above described air column resonance mode is least likely to be generated, the sound may be amplified or reduced by disposing the structure body inside the first tube structure 12. Therefore, the sound cannot be reliably reduced at the frequency in the peripheral region of the frequency $f_n$. The case of the frequency $f_{n+1}$ ($=(n+1)c/(2L)$) is the same.

In addition, as shown in FIG. 5, the frequency $f_n$ is an intermediate frequency between the frequency $f_i$ and the frequency $f_{i+1}$, and the frequency $f_{n+1}$ is an intermediate frequency between the frequency $f_{i+1}$ and the frequency $f_{i+2}$.

Therefore, in order to realize soundproofing in a wideband in the soundproof structure body 10 according to the embodiment of the present invention, the structure body 16 is necessary to be disposed at a position inside of the first tube structure 12 where sound can be reliably reduced at the frequencies $f_n$ and $f_{n+1}$ where the air column resonance mode of the first tube structure 12 is least likely to be generated.

Figure 6:
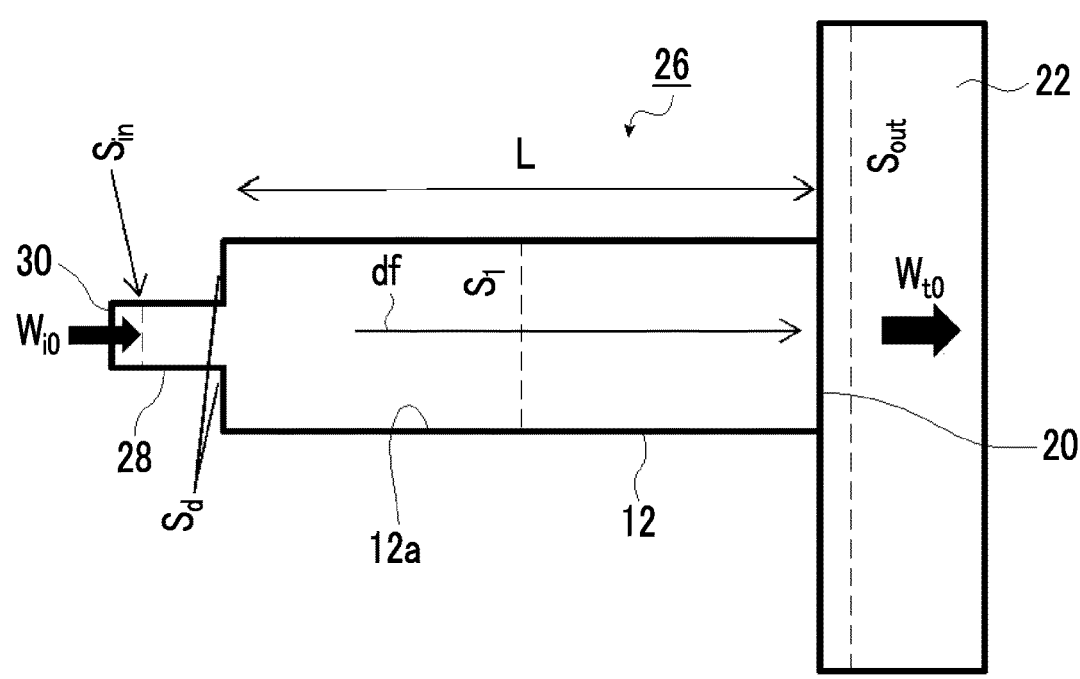
FIG. 6 is a schematic cross-sectional view of the soundproof structure body in which two tube structures are connected in series for explaining the soundproof principle of the present invention.

Therefore, first, the acoustic characteristics in a case of a linear tube structure body 26 as shown in FIG. 6 will be considered.

The tube structure body 26 has one end surface of a second tube structure 28 connected to the center of one end surface of the first tube structure 12, and is formed with a linear structure. In the tube structure body 26, sound is incident from an opening end 30 at the other end of the second tube structure 28, passes a connecting portion between the first tube structure 12 and the second tube structure 28, travels inside the first tube structure 12 in the forward direction df of a waveguide, is transmitted and radiated from the opening end 20 at the other end of the first tube structure 12 to the outlet-side space 22.

Here, assuming that an incident wave from the opening end 30 of the second tube structure 28 is denoted by $W_{i0}$ and a transmitted wave from the opening end 20 of the first tube structure 12 to the outlet-side space 22 is denoted by $W_{t0}$, a transmission matrix of the first tube structure 12 shown in FIG. 6 is represented by the following Expression (3).

$$\begin{bmatrix} A_0(f) & B_0(f) \\ C_0(f) & D_0(f) \end{bmatrix} = T_0 \qquad (3)$$

$$T_0 = \begin{bmatrix} \cos kL & j\frac{\rho c}{S_1}\sin kL \\ j\frac{S_1}{\rho c}\sin kL & \cos kL \end{bmatrix}$$

Here, k is the wave number and represented by $k=2\pi/\lambda$, $=2\pi f/c$. L is a length of the first tube structure 12. $\rho$ is density of air, for example, 1.2 (kg/m$^2$). c is a sound velocity, for example, 343 (m/s). $S_1$ is a cross-sectional area of the first tube structure 12. j represents an imaginary number.

With reference to 2.18 of Acoustics of Ducts and Mufflers second edition (by M. L. Munjal, John Wiley & Sons, Inc.), in a case where a ratio $W_{i0}/W_{t0}$ of energy $W_{i0}$ of the incident wave to energy $W_{t0}$ of the transmitted wave is calculated from the above Expression (3), the following Expression (7) can be represented. Here, $S_{in}$ is a cross-sectional area of the second tube structure 28, and $S_{out}$ is a cross-sectional area of the outlet-side space. In the present invention, in a case where the outlet-side space 22 is the open space, and the ratio $S_{out}/S_1$ of the cross-sectional area $S_{out}$ of the outlet-side space 22 to the cross-sectional area S of the first tube structure 12 is 10000 or more, the cross-sectional area $S_{out}$ of the outlet-side space 22 is regarded as $10000S_1$.

$$\frac{W_{i0}}{W_{t0}} = \frac{S_{in}}{4S_{out}}\left|A_0(f) + \frac{S_{out}B_0(f)}{\rho c} + \frac{\rho c C_0(f)}{S_{in}} + \frac{S_{out}}{S_{in}}D_0(f)\right|^2 \qquad (7)$$

Here, assuming that in a bonding portion side of the first tube structure 12 and the second tube structure 28, a cross-sectional area of a surface that reflects a sound wave traveling in a direction opposite to the waveguide forward direction of the first tube structure 12 and that is perpendicular to the waveguide forward direction is denoted by $S_d$, $S_{in}$ is represented by $S_{in}=S_1-S_d$. Therefore, the above Expression (7) is represented by the following Expression (8).

$$\frac{W_{i0}}{W_{t0}} = \frac{S_1-S_d}{4S_{out}}\left|A_0(f) + \frac{S_{out}B_0(f)}{\rho c} + \frac{\rho c C_0(f)}{S_1-S_d} + \frac{S_{out}}{S_1-S_d}D_0(f)\right|^2 \qquad (8)$$

In the case of the bending tube structure body 18 shown in FIG. 4, sound is incident from the opening end 24 of the second tube structure 14, passes the connecting portion between the first tube structure 12 and the second tube structure 28, and bends at a right angle at an end of the tube structure 1 or an end of the tube structure 2, travels inside the first tube structure 12 in the forward direction df of a waveguide, and is transmitted and radiated from the opening end 20 of the first tube structure 12 to the outlet-side space 22. Therefore, sound propagation in the first tube structure 12 is similar to the case of the bending tube structure body 18 shown in FIG. 4 and the case of the linear tube structure body 26 shown in FIG. 6.

However, the acoustic characteristics in the case of the bending tube structure body 18 shown in FIG. 4 are not the same as the acoustic characteristics in the case of the linear tube structure body 26 shown in FIG. 6, and both are different from each other. Therefore, the above Expression (8) cannot be satisfied as it is.

In the present invention, as described above, the bending structure refers to a case where an angle formed between a vector in the waveguide forward direction of the tube structure 1 and a vector in the waveguide forward direction of the tube structure 2 is 5 degrees or greater, and the linear structure refers to a case where the angle formed between the vector in the waveguide forward direction of the tube structure 1 and the vector in the waveguide forward direction of the tube structure 2 is smaller than 5 degrees.

Even in the case of the bending tube structure body 18 shown in FIG. 4, the transmission matrix of the first tube structure 12 shown in FIG. 4 is also expressed by the above Expression (3), and in a case of calculating the ratio $W_{i0}/W_{t0}$ of the incident wave $W_{i0}$ to the transmitted wave $W_{t0}$, the above Expression (8) is obtained similarly.

However, in the case of the bending tube structure body 18 shown in FIG. 4, in the bonding portion side of the first tube structure 12 and the second tube structure 28, the cross-sectional area $S_d$ of a surface that reflects a sound wave traveling in a direction opposite to the waveguide forward direction of the first tube structure 12 and that is perpendicular to the waveguide forward direction is equal to the cross-sectional area $S_1$ of the tube structure 12, and as a result, $S_1-S_d=0$. Therefore, it is necessary to introduce a correction term that assumes a case of a bending structure which is not a linear structure.

Here, assuming that the correction term is dS, the ratio $W_{i0}/W_{t0}$ of the incident wave $W_{i0}$ to the transmitted wave $W_{t0}$ can be expressed by the following Expression (9). The correction term dS can be, for example, $dS=0.01\times S_1$.

$$\frac{W_{i0}}{W_{t0}} = \left| \frac{S_1 - S_d + dS}{4S_{out}} \right| A_0(f) + \frac{S_{out}B_0(f)}{\rho c} + \frac{\rho c C_0(f)}{S_1 - S_d + dS} + \frac{S_{out}}{S_1 - S_d + dS}D_0(f) \Big|^2 \quad (9)$$

Here, in a case where the structure body 16 is disposed inside the first tube structure 12 of the bending tube structure body 18 shown in FIG. 4 to constitute the soundproof structure body 10 according to the embodiment of the present invention shown in FIG. 1, sound is propagated in the same manner as in the case of the bending tube structure body 18 shown in FIG. 4, and is transmitted and radiated from the opening end 20 of the first tube structure 12 to the outlet-side space 22.

Here, assuming that the incident wave from the opening end 30 of the second tube structure 28 is denoted by $W_{i0}$ and the transmitted wave from the opening end 20 of the first tube structure 12 to the outlet-side space 22 is denoted by $W_{t1}$, a transmission matrix of the first tube structure 12 shown in FIG. 1 is represented by the following Expression (4). Here, as shown in FIG. 1, $S_2$ is a cross-sectional area of the structure body 16 perpendicular to the forward direction df of a waveguide, d is a length of the structure body 16 in the forward direction df of a waveguide, and p is a distance from the opening end 20 to the structure body 16.

$$\begin{bmatrix} A(f) & B(f) \\ C(f) & D(f) \end{bmatrix} = T_1 T_2 T_3 \quad (4)$$

$$T_1 = \begin{bmatrix} \cos k(L-d-p) & j\frac{\rho c}{S_1}\sin k(L-d-p) \\ j\frac{S_1}{\rho c}\sin k(L-d-p) & \cos k(L-d-p) \end{bmatrix}$$

$$T_2 = \begin{bmatrix} \cos kd & j\frac{\rho c}{S_1-S_2}\sin kd \\ j\frac{S_1-S_2}{\rho c}\sin kd & \cos kd \end{bmatrix}$$

$$T_3 = \begin{bmatrix} \cos kp & j\frac{\rho c}{S_1}\sin kp \\ j\frac{S_1}{\rho c}\sin kp & \cos kp \end{bmatrix}$$

In a case of calculating a ratio $W_{i0}/W_{t1}$ of the incident wave $W_{i0}$ to the transmitted wave $W_{t1}$, the following Expression (10) can be represented from the above Expression (4).

$$\frac{W_{i0}}{W_{t1}} = \left| \frac{S_1 - S_d + dS}{4S_{out}} \right| A(f) + \frac{S_{out}B(f)}{\rho c} + \frac{\rho c C(f)}{S_1 - S_d + dS} + \frac{S_{out}}{S_1 - S_d + dS}D(f) \Big|^2 \quad (10)$$

As described above, in a case where the structure body 16 is disposed inside the first tube structure 12 of the bending tube structure body 18 to form the soundproof structure body 10 according to the embodiment of the present invention shown in FIG. 1, compared with the case where the structure body 16 is not disposed inside the first tube structure 12 of the bending tube structure body 18, a transmission loss TL is given by the following Expression (11).

$$TL = 10\log_{10}(W_{t0}/W_{t1}) \quad (11)$$
$$= 10\log_{10}(\text{right side of the above Expression}(9)/$$
$$\text{right side of the above Expression}(10))$$

In the above Expression (11), assuming that (right side of the above Expression (9)/right side of the above Expression (10))=X(f), the transmission loss TL is represented by TL=10 $\log_{10}$ (X(f)). Therefore, assuming that X(f)>1, the transmission loss TL becomes positive (TL>0), and as a result, it can be seen that the transmission loss is generated and the soundproof effect is generated.

Where, X(f) can be represented by the following Expression (2).

$$X(f) = \frac{\left| A(f) + \frac{S_{out}B(f)}{\rho c} + \frac{\rho c C(f)}{S_1 - S_d + dS} + \frac{S_{out}}{S_1 - S_d + dS}D(F) \right|^2}{\left| A_0(f) + \frac{S_{out}B_0(f)}{\rho c} + \frac{\rho c C_0(f)}{S_1 - S_d + dS} + \frac{S_{out}}{S_1 - S_d + dS}D_0(f) \right|^2} \quad (2)$$

X(f) is a parameter representing the transmission loss of the soundproof structure body 10 according to the embodiment of the present invention in which the structure body 16 is disposed inside the first tube structure 12.

In the soundproof structure body 10 according to the embodiment of the present invention, soundproof effect in a wide-band can be generated by disposing the structure body 16 inside the first tube structure 12 so that a value of X(f) becomes greater than 1 (X(f)>1).

The theory of deriving Expression of the transmission matrix described above is basically based on an assumption that a sound wave is a plane wave traveling straight from an inlet toward an outlet of a tube structure such as a duct without a disturbance of a wave surface. As described above, the theory is based on the premise that sound flows with the plane wave. Therefore, in a situation where the sound flows as a non-plane wave, the theory is not valid.

Here, when a plane wave of sound flows inside the first tube structure 12 having the cross-sectional area of $S_1$ in the forward direction df of a waveguide, a mode of a surface in a direction perpendicular to the forward direction df of a waveguide rises. For example, in a case where a cross-sectional shape of the first tube structure 12 is rectangular, assuming that a length of the long side is a, a is $n\lambda/2$ (n is a natural number), and for example, at a frequency corresponding to $\lambda$, resonance occurs and therefore sound may not come out at all. This frequency is a frequency at which sound flows as a non-plane wave through the pipe line cross-section of the first tube structure 12. In a case of a frequency higher than this frequency, an independent standing wave (mode) may be generated in a direction perpendicular to the forward direction df of a waveguide. Such a mode is formed, sound is prevented from flowing as a plane wave.

Depending on a sound source and setting conditions of a calculation model, the mode may not be generated such as a case where a completely ideal plane wave may be introduced into a waveguide and there may be no scatterer or the like in the waveguide. However, in actual fact, it is difficult to set the sound source to introduce the completely ideal plane wave. In a case where a cross-section of the waveguide is rectangular, a criterion of a frequency at which sound propagates as the non-plane wave regardless of the sound source conditions is given by c/a corresponding to n=2.

Accordingly, assuming that the sound flows through the pipe line cross-section of the first tube structure 12 as the plane wave and the frequencies where the above theory is valid are set to and $f_{n+1}$, since $X(f_n)>1$ and $X(f_{n+1})>1$ and $f_n<f_{n+1}$, the frequency $f_{n+1}$ is necessary to be smaller than c/a.

As described above, in the present invention, it is necessary to satisfy $f_{n+1}<c/a$.

In the present invention, the tube structure body 18 connecting the first tube structure 12 to the second tube structure 14 has at least one opening end 20 of the first tube structure 12, and any tube structure body may be adopted as long as the structure is formed of a tubular shape. In addition, such a tube structure body may be used for a large number of applications, and it is preferable to have air permeability. Therefore, it is preferable that both ends (that is, each end of the first tube structure 12 and the second tube structure 14) of the tube structure body 18 are opening ends and both sides are opened. However, in a case where one end of the tube structure body 18 is attached to the sound source, only the other end may be opened to be the opening end.

The tubular shape of the tube structure body 18 may be a bending tubular shape having a bending structure with a rectangular cross-section as shown in FIG. 2, but is not particularly limited thereto. The tube structure body 18 may have, for example, the linear tubular shape as shown in FIG. 6 as long as a structure body is disposed therein, but the tube structure body 18 is preferably bent. Furthermore, a cross-sectional shape of the tube structure body 18 (that is, the first tube structure 12 and the second tube structure 14) is also not particularly limited, and any shape may be adopted. For example, the cross-sectional shape of each of the first tube structure 12, the second tube structure 14, and the tube structure body 18 may be a regular polygon such as a square, a regular triangle, a regular pentagon, or a regular hexagon. In addition, the cross-sectional shape of each of the first tube structure 12, the second tube structure 14, and the tube structure body 18 may be a polygon such as a triangle including an isosceles triangle, a right-angled triangle, and the like, a rectangle including a rhombus, and a parallelogram, a pentagon, or a hexagon, and alternatively, may be an irregular shape. In addition, the cross-sectional shape of each of the first tube structure 12, the second tube structure 14, and the tube structure body 18 may be a circle or an ellipse. In addition, the cross-sectional shape of each of the first tube structure 12, the second tube structure 14, and the tube structure body 18 may be changed in the middle of the tube structure body 18. Furthermore, the cross-sectional shape of the first tube structure 12 and the cross-sectional shape of the second tube structure 14 may be different from each other.

In a case where each cross-sectional shape of the first tube structure 12 and the second tube structure 14 is the polygon, the circle, the ellipse, or the like, the cross-sectional areas may be obtained according to the cross-sectional shapes thereof. However, in a case where the cross-sectional shape is the irregular shape, for example, a case where an outer shape of the cross-sectional shape has roughness or the like, the cross-sectional area may be obtained by determining the cross-sectional shape based on a curve smoothly connecting peaks of protrusion portions or a curve smoothly connecting valleys of recessed portions to set the cross-sectional area $S_1$ of the first tube structure 12 and the cross-sectional area $S_{in}$ of the second tube structure 14. In a case where the cross-sectional shape can be similar to an equivalent circle, an area of the equivalent circle may be obtained as the cross-sectional area.

The cross-sectional area $S_{out}$ of the outlet-side space 22, the cross-sectional area $S_2$ of the structure body 16, and the cross-sectional area $S_d$ of the surface that reflects the sound wave in a bonding portion side of the first tube structure 12 and the second tube structure 28 may be obtained in the same way.

Examples of the soundproof structure body 10 according to the embodiment of the present invention that is applied to, for example, industrial equipment, transportation equipment, general household equipment, or the like can include a duct, a muffler, or the like. Examples of the industrial equipment include a copying machine, a blower, air conditioning equipment, a ventilator, a pump, a generator, as well as various kinds of manufacturing equipment capable of emitting sound such as a coating machine, a rotary machine, a conveyor machine, and the like. Examples of the transportation equipment include an automobile, a train, an aircraft, and the like. Examples of the general household equipment include a refrigerator, a washing machine, a dryer, a television, a copying machine, a microwave oven, a game machine, an air conditioner, a fan, a PC, a vacuum cleaner, an air purifier, and the like.

Examples of the soundproof structure body 10 according to the embodiment of the present invention that is applied to, in particular, a muffler for an automobile, a duct included in a device or a machines having a duct attached to electronic equipment such as a copying machine, and a duct for a building such as a ventilation sleeve, and a duct for building materials.

In the above described example, as a structure body disposed inside the first tube structure 12 of the present invention, the rectangular parallelepiped structure body 16 that generates a reflection wave by closing a part below the cross-section of the pipe line and changing the cross-sectional area of the pipe line is used. However, the present invention is not limited thereto, and any shape of the structure body may be used as long as it is possible to generate the reflection wave by closing at least a part of the cross-section of the pipe line of the first tube structure 12 and changing the cross-sectional area of the pipe line.

Furthermore, in the soundproof structure body according to the embodiment of the present invention, a plurality of structure bodies 16 may be used as long as a reflection wave can be generated by changing the cross-sectional area of the pipe line.

Furthermore, any structure body may be used as long as the cross-sectional area of the pipe line is changed by disposing the structure body inside the first tube structure 12 of the present invention to generate a reflection wave and the sound radiated from the opening end 20 of the first tube structure 12 to the outlet-side space 22 can be reduced by canceling or absorbing sound traveling inside the first tube structure 12 in the forward direction df of a waveguide. For example, as the structure body, for example, a resonance type soundproof structure body such as a Helmholtz resonator, an air column resonance cylinder, or a film vibration type structure body described later is used, so that particularly efficient soundproofing can be performed with respect to sound at a resonance frequency and soundproofing in a wide-band can be achieved.

As described above, in a case where a resonator, which is the resonance type structure body such as a Helmholtz resonator, an air column resonance cylinder, or a film vibration type structure body, is used as the structure body, a plurality of resonators may be used according to the size of the cross-section of the first tube structure 12.

Here, the Helmholtz resonator has a cover with an opening portion and a closed rear space disposed on a rear surface of the opening portion. The details of the Helmholtz resonator will be described later.

Furthermore, the air column resonance cylinder is a cylindrical body or a tubular body having a slit-shaped opening portion formed along one end surface.

In addition, a film resonator such as the film vibration type structure body is a resonator formed of a film and a closed rear space.

The Helmholtz resonator, the air column resonance cylinder, and the film resonator such as the film vibration type structure body used in the present invention are not particularly limited, and any known Helmholtz resonator, air column resonance cylinder, and film resonator may be used.

Furthermore, the structure body 16 and the first tube structure 12 may be integrally formed. Furthermore, the first tube structure 12 and the second tube structure 14 may be integrally formed.

In a case where the structure body 16 and the first tube structure 12 may be integrally formed, the structure body 16 may be formed as a structure including a bottom surface 12a having a recessed rectangular parallelepiped shape by forming the bottom surface 12a of the first tube structure 12 to be recessed into the rectangular parallelepiped shape on an upper side shown in FIG. 2.

Furthermore, the structure body 16 may be attachable to and detachable from the first tube structure 12. Furthermore, the second tube structure 14 may be attachable to and detachable from the first tube structure 12.

For example, in the soundproof structure body 10 shown in FIG. 1, although details are not shown, a magnet is fixed to at least a part of an outer surface of the bottom of the structure body 16, a magnet having different polarity is fixed to at least a part of a position corresponding to an inner surface of the bottom of the first tube structure 12, and as a result, a pair of magnets having different polarities is closely attached and fixed to be attachable and detachable, so that the structure body 16 may be attachably and detachably fixed to the first tube structure 12. Alternatively, the structure body 16 may be attachably and detachably fixed to the first tube structure 12 using a hook-and-loop fastener such as Magic Tape (registered trademark) (manufactured by Kuraray Fastening Co., Ltd.) or a double-sided tape instead of a pair of magnets, and both may be fixed using a double-sided tape.

The same structure is applied to the second tube structure 14 that can be attached to and detached from the first tube structure 12.

Materials used for the first tube structure 12 and the second tube structure 14 of the tube structure body 18, and the structure body 16 are not limited as long as the materials have strength suitably applied to a soundproof target and resistance to soundproof environment of the soundproof target, and can be selected based on the soundproof target and the soundproof environment. Examples of the materials used for the first tube structure 12, the second tube structure 14, the structure body 16, and the like include: metal materials such as aluminum, titanium, magnesium, tungsten, iron, steel, chromium, chromium molybdenum, nichrome molybdenum, and alloys thereof; resin materials such as an acrylic resin, methyl polymethacrylate, polycarbonate, polyamideimide, polyarylate, polyether imide, polyacetal, polyether ether ketone, polyphenylene sulfide, polysulfone, polyethylene terephthalate, polybutylene terephthalate, polyimide, and triacetyl cellulose; carbon fiber reinforced plastic (CFRP); carbon fiber; glass fiber reinforced plastic (GFRP); and the like.

Furthermore, multiple kinds of the materials may be used in combination.

The materials used for the first tube structure 12, the second tube structure 14, the structure body 16, and the like may be the same as or different from each other. In a case where the structure body 16 and the first tube structure 12 of the tube structure body 18 are integrally formed, it is preferable that the materials used for the first tube structure 12 and the structure body 16 are the same as each other.

A method of disposing the structure body 16 inside the first tube structure 12 is not particularly limited, including the case where the structure body 16 is attachably and detachably disposed from and to the first tube structure 12, and known methods may be used.

EXAMPLES

The soundproof structure body according to the embodiment of the present invention will be specifically described based on examples.

Example 1

First, the bending tube structure body 18 formed by the first tube structure 12 and the second tube structure 14 which are connected to each other at a right angle shown in FIG. 2 is used, and the structure body 16 is disposed inside the first tube structure 12 of the tube structure body 18 to manufacture the soundproof structure body 10 according to the embodiment of the present invention shown in FIG. 1.

The tube structure body 18 having the dimension of the first tube structure 12 of the tube structure body 18 is 88 mm×163 mm (cross-section)×394 mm (length), and the dimension of the second tube structure 14 is 64 mm×163 mm (cross-section)×27.4 mm (length) was used.

The length L of the first tube structure 12 was set to 0.435 m (L=0.394 m+0.0405 m=0.435 m) obtained by adding 0.0405 m of an opening end correction to the actual length of 0.394 m.

The cross-sectional area $S_1$ of the first tube structure 12 was 0.0143 m² ($S_1$=0.088 m×0.163 m=0.0143 m²). The cross-sectional area $S_d$ of the surface that reflects the sound wave in the bonding portion side of the first tube structure 12 and the second tube structure 28 was equal to the cross-sectional area $S_1$, and was 0.0143 m² ($S_1$=$S_d$=0.0143 m²).

The structure body 16 having the dimension of 20 mm×163 mm (cross-section)×40 mm (length) was used.

The length d of the structure body 16 was 0.04 m, and the cross-sectional area $S_2$ was 0.00326 m² ($S_1$=0.020 m×0.163 m=0.00326 m²).

Figure 7:
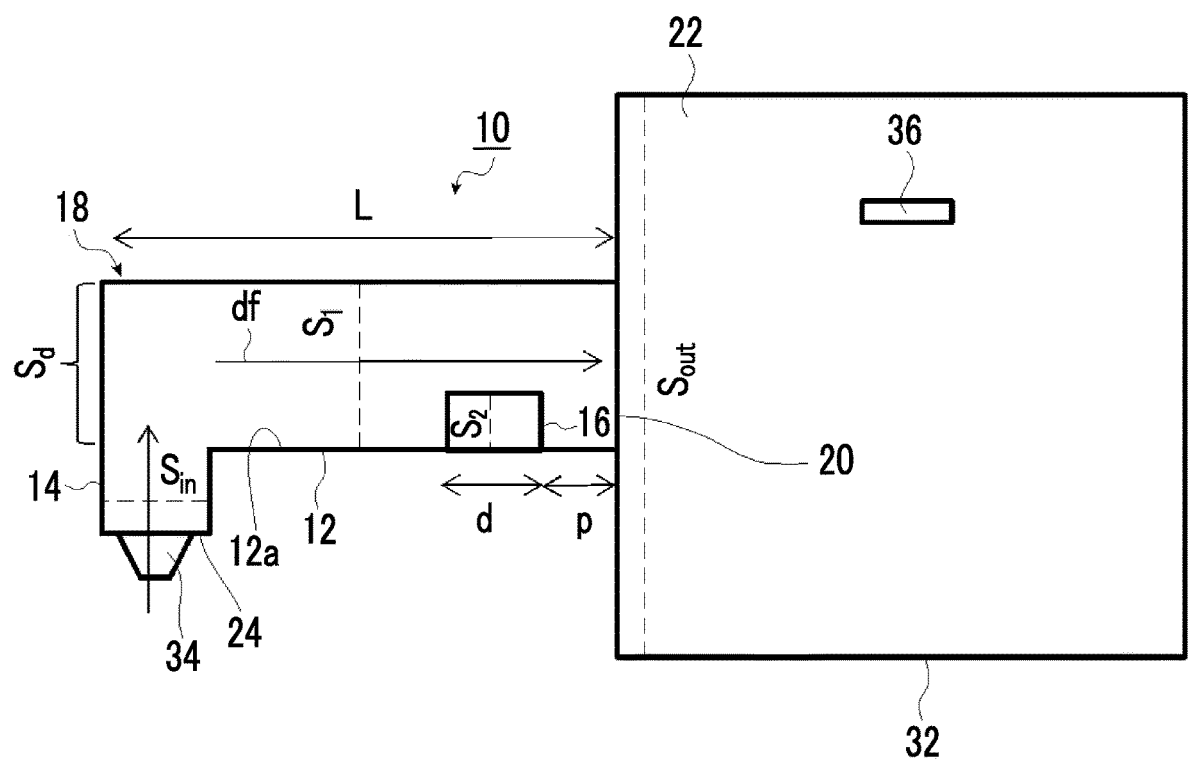
FIG. 7 is a schematic cross-sectional view for explaining a measurement system in Example of the present invention.

The opening end 20 of the first tube structure 12 of the manufactured soundproof structure body 10 was connected to a measurement chamber 32 serving as the outlet-side space 22, as shown in FIG. 7.

The dimension of the measurement chamber 32 was 10 m×5 m (cross-section)×15 m (length).

The cross-sectional area $S_{out}$ of the outlet-side space 22 was 50 m² ($S_{out}$=5 m×10 m=50 m²).

The opening end 20 of the soundproof structure body 10 was disposed at the center of the cross-section of the measurement chamber 32.

Next, as shown in FIG. 7, a sound source 34 and a microphone 36 were disposed on the tube structure body 18 of the soundproof structure body 10. The sound source 34 was disposed and closely attached to the opening end 24 of the second tube structure 14 of the tube structure body 18. The microphone 36 for measurement was installed in the measurement chamber 32 at a position 500 mm spaced from the opening end 20 of the first tube structure 12 of the tube structure body 18 of the soundproof structure body 10 and 500 mm spaced upward from the bottom surface 12a of the first tube structure 12.

The sound source 34 and the microphone 36 are disposed at the positions, and as shown in FIG. 7, sound was generated from the sound source 34, and a sound pressure was measured by the microphone 36 in a state where the structure body 16 is installed inside the first tube structure 12 and a state where the structure body 16 is not installed, respectively. The transmission loss of the soundproof structure body 10 was calculated from measured values.

Here, assuming that the sound pressure measured by the microphone 36 in the case where the structure body 16 is not installed is denoted by p0 and the sound pressure in the case where the structure body 16 is installed is denoted by p1, the transmission loss TL is obtained by TL=20 $\log_{10}$ (p0/p1).

In the configuration of the soundproof structure body shown in FIG. 7, the installation position of the structure body 16 inside the first tube structure 12 was changed, a distance p from the opening end 20 of the first tube structure 12 to the installation position of the structure body 16 was changed, and the sound pressure was measured by the microphone 36 at frequencies from 100 Hz to 2000 Hz for Example 1, and Comparative Examples 1-1 to 1-3 of the soundproof structure body 10 according to the embodiment of the present invention to calculate the transmission loss of the soundproof structure body from the measured values of the sound pressure. In this manner, experimental values of the transmission loss at the frequencies from 100 Hz to 2000 Hz were obtained. The distances p of Example 1, Comparative Example 1-1, Comparative Example 1-2, and Comparative Example 1-3 were 0 cm, 8 cm, 12 cm, and 16 cm, respectively.

The obtained experimental values of Example 1, Comparative Example 1-1, Comparative Example 1-2, and Comparative Example 1-3 are shown in FIGS. 8 to 11, respectively.

Here, since the frequency $f_{n+1}$ at which the theory for calculating the above Expression (2) is valid is necessary to be smaller than c/a, an upper limit of the frequency was set to 2000 Hz. Here, since the longest line segment length a of line segments constituting an outer edge of the cross-section of the first tube structure 12 is 163 mm=0.163 m and the sound velocity c is 343 m/s, c/a=343/0.163=2104 Hz, and as a result, $f_{n+1}$<2104 Hz.

On the other hand, by using the above Expression (2), the transmission loss parameter X(f) for Example 1 and Comparative Examples 1-1 to 1-3 of the soundproof structure body 10 according to the embodiment of the present invention was calculated at the frequencies from 100 Hz to 2000 Hz, and a theoretical value (theoretically calculated value) of the transmission loss of the soundproof structure body was calculated according to the following Expression (6).

$$TL=10\ \log_{10}(X(f)) \qquad (6)$$

The obtained theoretical values of Example 1, Comparative Example 1-1, Comparative Example 1-2, and Comparative Example 1-3 are shown in FIGS. 8 to 11 together with each of the experimental values, respectively.

Values of the transmission loss parameter X(f) at frequencies of 400 Hz, 800 Hz, 1200 Hz, and 1600 Hz for Example 1, Comparative Example 1-1, Comparative Example 1-2, and Comparative Example 1-3 are shown in Table 1.

In the present Examples and Comparative Examples, in a case where the frequency $f_n$ at which a stable column resonance mode is hardly generated in the first tube structure 12 having the length L is represented by nc/2L, since the opening end corrected L is 0.435 m and c is 343 m/s, nc/2L=343/(0.435×2)=394 n (Hz).

Accordingly, the frequencies of 400 Hz, 800 Hz, 1200 Hz, and 1600 Hz correspond to cases where n is 1, 2, 3, and 4, respectively.

TABLE 1

|  | Example 1 | Comparative Example 1-1 | Comparative Example 1-2 | Comparative Example 1-3 | Example 2 | Example 3 |
|---|---|---|---|---|---|---|
| p[cm] | 0 | 8 | 12 | 20 | 0 | 0 |
| X (400 Hz) | 1.12 | 1.14 | 1.08 | 0.91 | 1.29 | 1.12 |

TABLE 1-continued

|  | Example 1 | Comparative Example 1-1 | Comparative Example 1-2 | Comparative Example 1-3 | Example 2 | Example 3 |
|---|---|---|---|---|---|---|
| X (800 Hz) | 1.32 | 0.80 | 0.78 | 1.32 | 1.72 | 1.33 |
| X (1200 Hz) | 1.25 | 0.98 | 1.49 | 0.70 | 1.40 | 1.25 |
| X (1600 Hz) | 0.89 | 1.58 | 0.66 | 1.30 | 0.69 | 0.89 |

From the results in Table 1, in Example 1 in which the distance p is 0 cm, it is clear that the transmission loss parameter X(f) was greater than 1 at the frequencies of 400 Hz, 800 Hz, and 1200 Hz which is three adjacent frequencies $f_n$ (=nc/2L), and the transmission loss TL was positive from the above Expression (6). The frequency between the adjacent frequencies can be represented by $f_i$ (=(2i+1) c/4L=(i+½) c/2L), so that the frequency generate the stable column resonance mode in the first tube structure 12 having the length L. It is considered that at and near the frequencies $f_i$ (200 Hz, 600 Hz, 1000 Hz, 1400 Hz, and 1800 Hz), the stable column resonance mode is disturbed by disposing the structure body 16 in the first tube structure 12, and therefore the transmission loss TL is generated.

Therefore, in Example 1, the transmission loss in a wide-band can be obtained.

Figure 8:
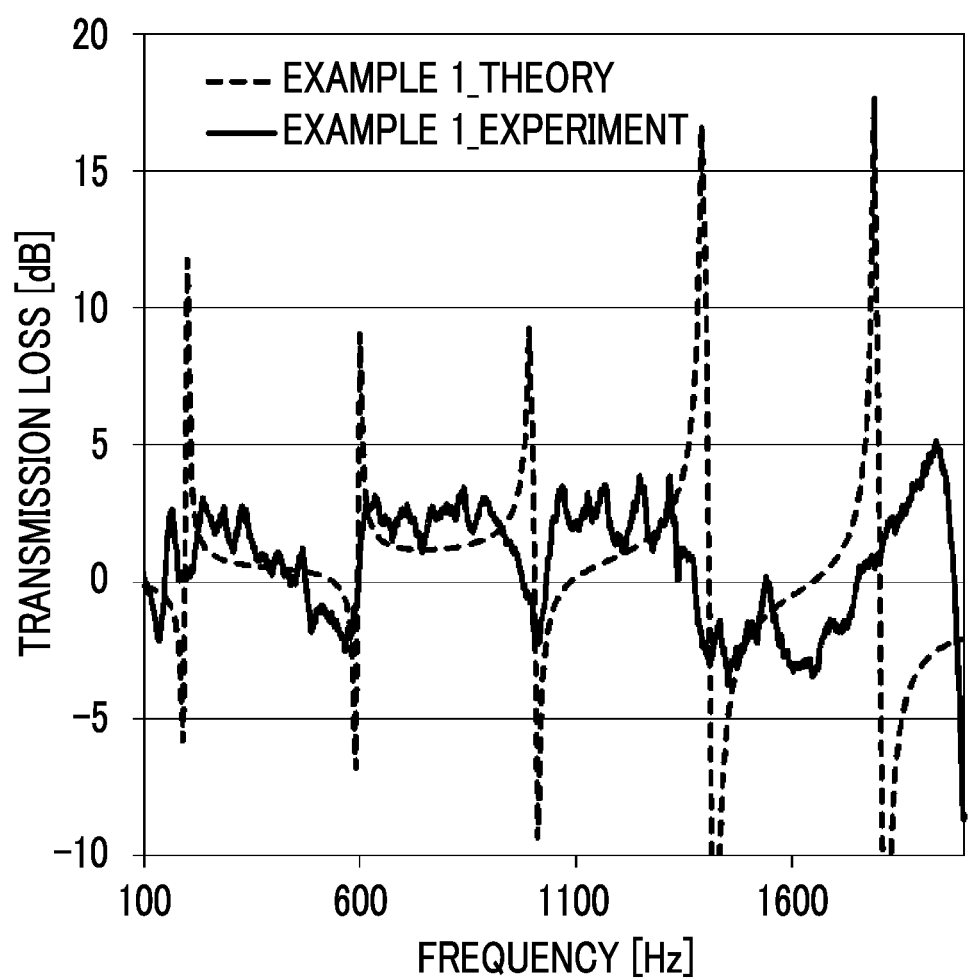
FIG. 8 is a graph showing a relationship between a transmission loss and a frequency according to Example 1 of the present invention.

Since the transmission loss was also positive at 400 Hz, 800 Hz, and 1200 Hz from the experiment and theoretical calculation shown in FIG. 8, and the transmission loss was positive even at frequencies near the frequencies, it can be seen that the transmission loss in a wide-band was obtained.

As described above, in Example 1, $f_n$ whose transmission loss is greater than 0 exists in consecutive adjacent $f_n$, and it can be seen that the transmission loss in a wide-band is obtained.

On the other hand, as is clear from the results in Table 1, in Comparative Example 1-1 in which the distance p is 8 cm, the transmission loss parameter X(f) was greater than 1 at 400 Hz and 1600 Hz, but the transmission loss parameter X(f) was smaller than 1 at adjacent 800 Hz and 1200 Hz.

Similarly, in Comparative Example 1-2 in which the distance p is 12 cm, the transmission loss parameter X(f) was greater than 1 at 400 Hz and 1200 Hz, but the transmission loss parameter X(f) was smaller than 1 at adjacent 800 Hz and 1600 Hz.

In addition, similarly, in Comparative Example 1-3 in which the distance p is 20 cm, the transmission loss parameter X(f) was greater than 1 at 800 Hz and 1600 Hz, but the transmission loss parameter X(f) was smaller than 1 at adjacent 400 Hz and 1200 Hz. As is clear from the above results of Table 1, in Comparative Examples 1-1, 1-2, and 1-3, frequencies where X(f) is smaller than 1 exist at two or more consecutive adjacent frequencies $f_n$ consisting of 400 Hz, 800 Hz, 1200 Hz, and 1600 Hz, and it can be seen that the transmission loss in a wide-band is not obtained.

Figure 9:
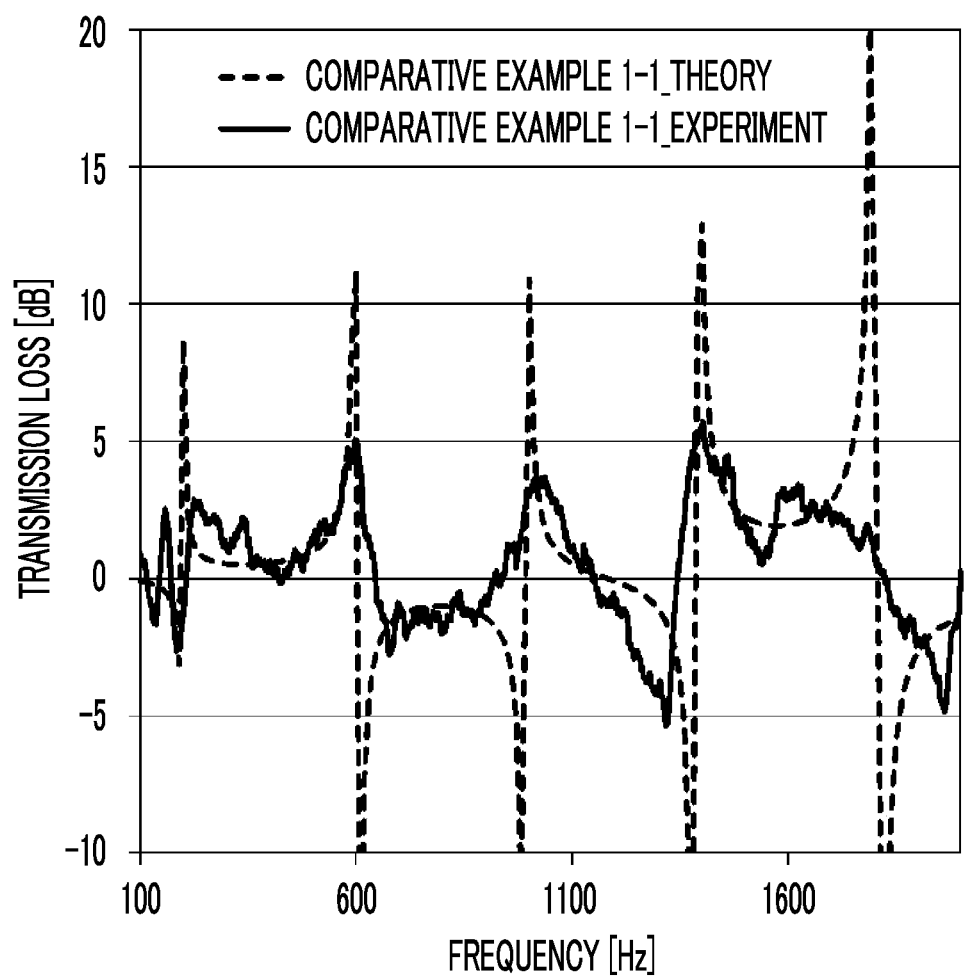
FIG. 9 is a graph showing a relationship between a transmission loss and a frequency according to Comparative Example 1-1 of the present invention.
Figure 10:
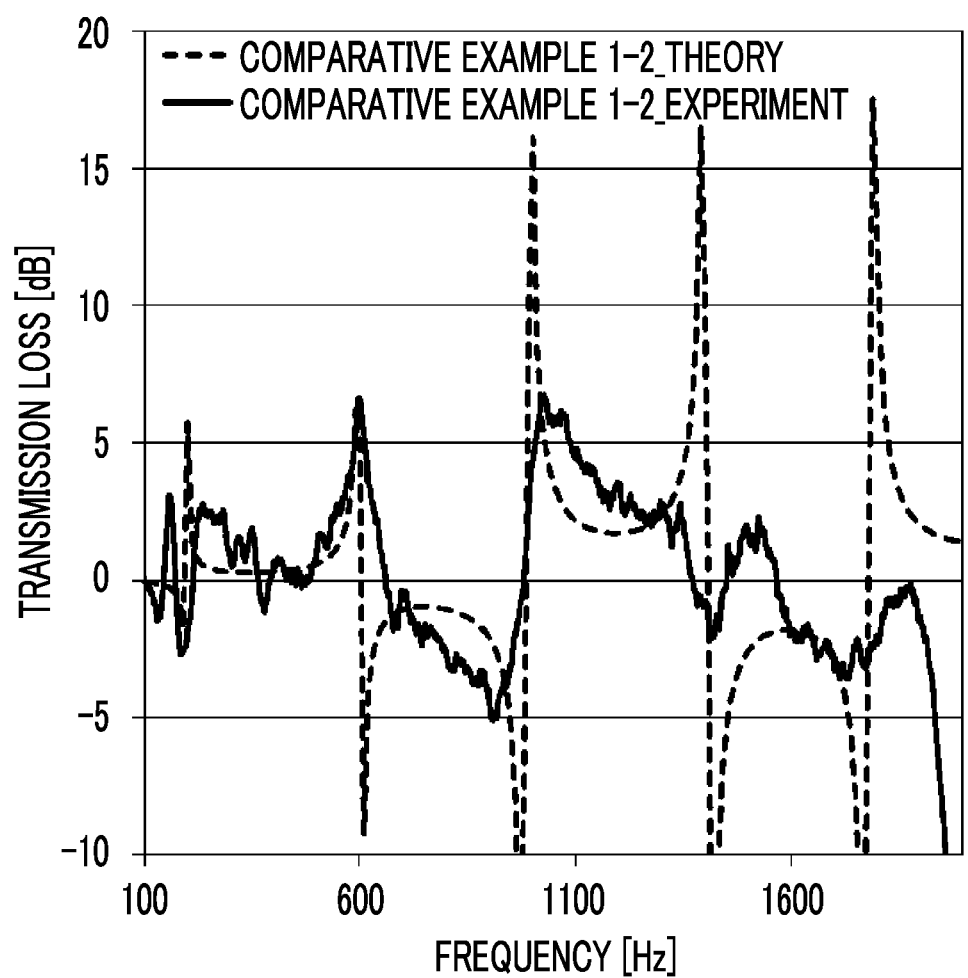
FIG. 10 is a graph showing a relationship between a transmission loss and a frequency according to Comparative Example 1-2 of the present invention.
Figure 11:
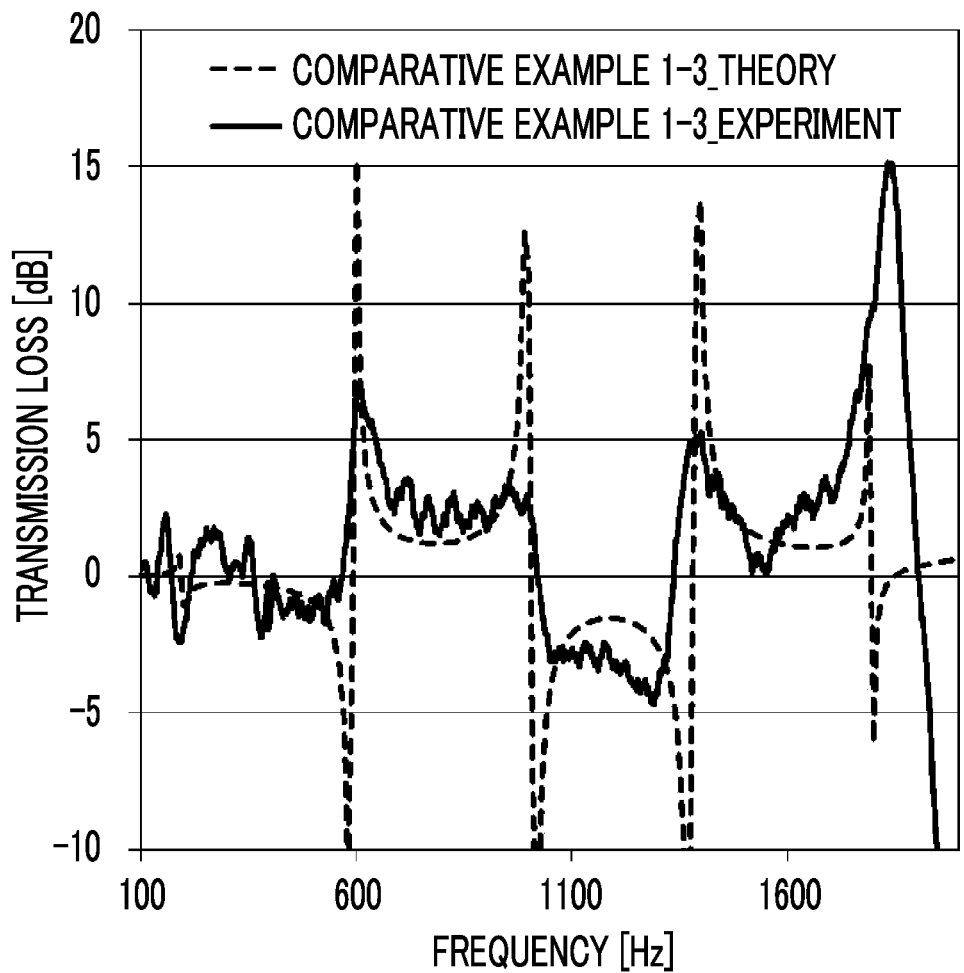
FIG. 11 is a graph showing a relationship between a transmission loss and a frequency according to Comparative Example 1-3 of the present invention.

It can be seen from experiments shown in FIGS. 9, 10, and 11, and theoretical calculation that in Comparative Examples 1-1, 1-2, and 1-3, a frequency region in which the transmission loss is positive and a frequency region in which the transmission loss is negative alternately appear in the frequency band including 400 Hz, 800 Hz, 1200 Hz and 1600 Hz, and the transmission loss in a wide-band is not obtained.

As described above, in Comparative Examples 1-1, 1-2, and 1-3, the transmission loss was not simultaneously positive (greater than 0) in the consecutive adjacent $f_n$, and as a result, it can be seen that the transmission loss in a wide-band was not obtained.

From the above results, the effectiveness of the present invention is shown, and the effect of the present invention is clearly exhibited.

Example 2

Figure 12:
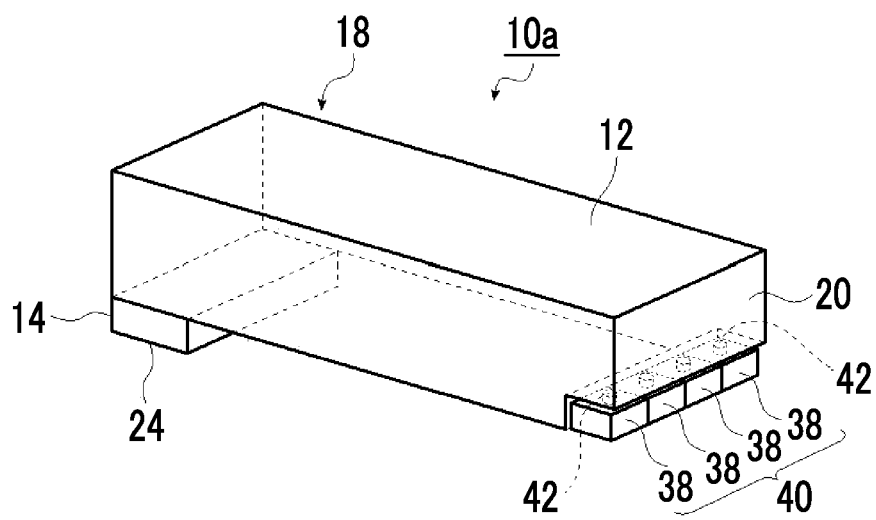
FIG. 12 is a schematic perspective view showing an example of a soundproof structure body according to another embodiment of the present invention.

As shown in FIG. 12, a soundproof structure body 10a of Example 2 having the same configuration as in Example 1 was manufactured except that the structure body 16 of the soundproof structure body 10 of Example 1 shown in FIG. 1 is replaced with a structure body 40 formed of four Helmholtz resonators 38 which is a resonance structure body.

Figure 13:
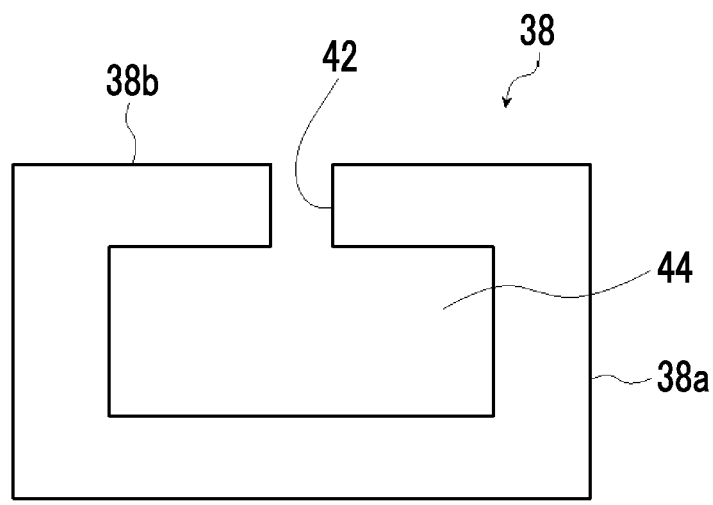
FIG. 13 is a schematic cross-sectional view of an example of a resonator provided with the soundproof structure body shown in FIG. 12.

As shown in FIG. 13, the Helmholtz resonator 38 has a cylindrical opening 42 at the center of a cover 38b corresponding to a top plate of a rectangular parallelepiped housing 38a, and a closed rear space 44 serving as a rear surface of the opening 42 is included in the housing 38a.

Here, the Helmholtz resonator 38 shown in FIG. 13 was formed with a 5 mm plate material, an outer dimension of the housing 38a was 30 mm×40 mm (cross-section)×50 mm (length), and a diameter of the opening 42 was 8 mm. The dimension of the rear space 44 was 20 mm×30 mm (cross-section)×40 mm (length).

The Helmholtz resonator 38 was a resonance structure body having resonance at 700 Hz.

Therefore, the length d of the structure body 40 was 0.05 m, and the cross-sectional area $S_2$ was 0.00048 m² ($S_1$=0.030 m×0.040 m×4=0.0048 m²).

Instead of the soundproof structure body 10 shown in FIG. 7, the soundproof structure body 10a shown in FIG. 12 was attached to the measurement chamber 32, and the sound pressure was measured by the microphone 36 with respect to the soundproof structure body 10a of Example 2 at the frequencies from 100 Hz to 2000 Hz in exactly the same manner as in Example 1, and the transmission loss of the soundproof structure body was calculated from the measured value of the sound pressure. In this manner, experimental values of the transmission loss at the frequencies from 100 Hz to 2000 Hz were obtained. The distance p in Example 2 was 0 cm.

Figure 14:
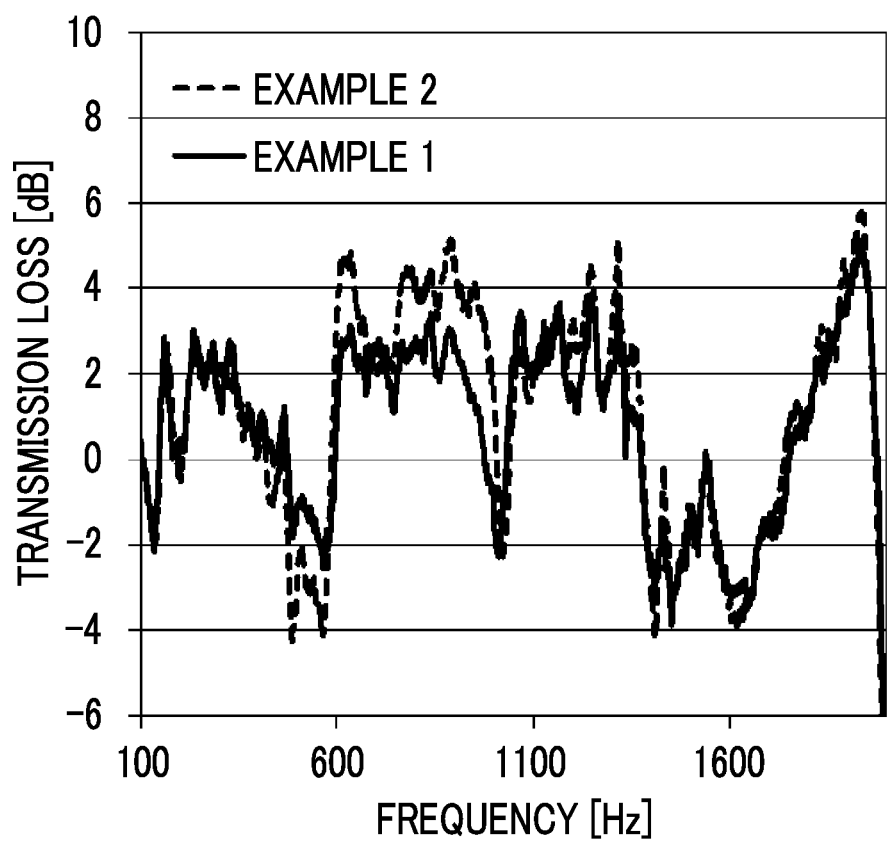
FIG. 14 is a graph showing a relationship between a transmission loss and a frequency according to Example 2 and the transmission loss and the frequency according to Example 1 of the soundproof structure body shown in FIG. 12.

The obtained experimental values of Example 2 are shown in FIG. 14 together with the experimental values of Example 1.

On the other hand, by using the above Expression (2), values (theoretical calculation values) of the transmission loss parameter X(f) at the frequencies of 400 Hz, 800 Hz, 1200 Hz, and 1600 Hz were obtained with respect to the soundproof structure body 10a according to Example 2 of the present invention. The results are shown in Table 1.

From the results in Table 1, in Example 2, it is clear that the transmission loss parameter X(f) was greater than 1 at the frequencies of 400 Hz, 800 Hz, and 1200 Hz which is three adjacent frequencies $f_n$ (=nc/2L), and the transmission loss TL was positive from the above Expression (6), in the same as in Example 1.

Therefore, in Example 2, the transmission loss in a wide-band can be obtained, in the same as in Example 1.

The result is clearly exhibited from the experimental values shown in FIG. 14.

Furthermore, as shown in FIG. 14, it can be seen that in the case of Example 2 using the structure body 40 which is a resonator, the transmission loss was improved at near 700 Hz which is the resonance frequency of the Helmholtz resonator 38 as compared with Example 1 using the structure body 16 which is not a resonance structure body.

The transmission losses in Example 1 of the soundproof structure body 10 shown in FIG. 1 and in Example 2 of the soundproof structure body 10a shown in FIG. 12 were simultaneously simulated using a COMSOL MultiPhysics Ver 5.3a acoustic module. The results are shown in FIG. 15.

Figure 15:
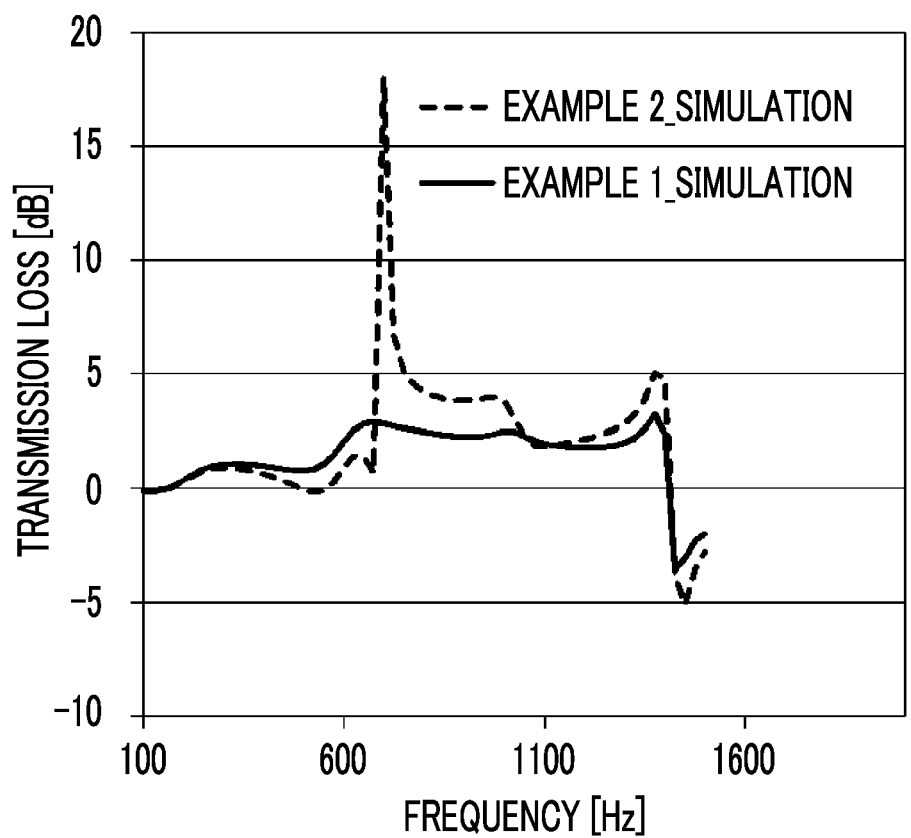
FIG. 15 is a graph showing a simulation result of the relationship between transmission losses and frequencies according to Examples 1 and 2 of the present invention.

As is clear from the results of the simulation results shown in FIG. 15, it can be seen that the transmission loss of Example 2 was improved at near 700 Hz which is the resonance frequency of the Helmholtz resonator 38 as compared with Example 1.

Therefore, from the viewpoint of soundproofing, it is more advantageous that the structure body disposed inside the first tube structure 12 is a resonance structure body such as the Helmholtz resonator 38.

Example 3

Figure 16:
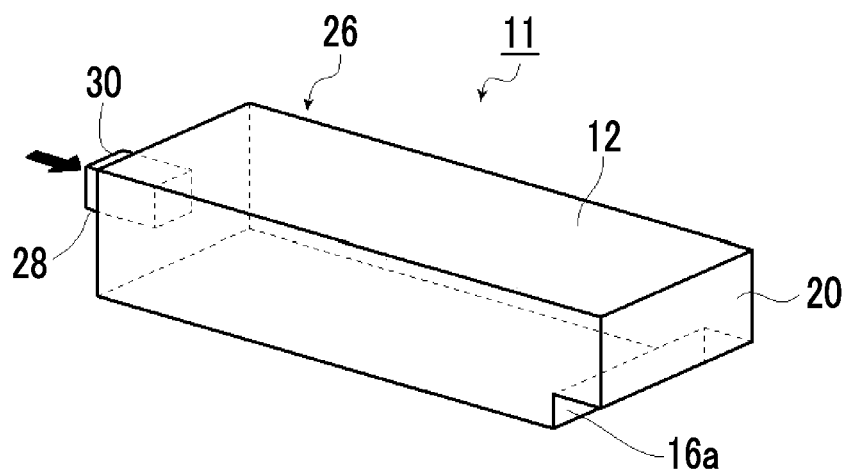
FIG. 16 is a schematic perspective view showing an example of a soundproof structure body according to another embodiment of the present invention.

Instead of the bending tube structure body 18 of the soundproof structure body 10 of Example 1 shown in FIG. 1, as shown in FIG. 16, a linear soundproof structure body 11 of Example 3 having the same configuration as in Example 1 was manufactured except that the linear tube structure body 26, in which the second tube structure 28 is connected to a wall surface facing the opening end 20 of the tube structure 12 is used, and the structure body 16 was formed by recessing the bottom surface 12a of the first tube structure 12.

The linear tube structure body 26 shown in FIG. 6, the soundproof structure body 11 according to Example 3 of FIG. 16 refers to the configuration in which the structure body 16a is formed on the opening end 20 of the first tube structure 12.

The structure body 16a has exactly the same function as the structure body 16 in the first tube structure 12 of the soundproof structure body 10 of Example 1 shown in FIG. 1.

The dimension of the second tube structure 28 of the soundproof structure body 11 of Example 3 was 30 mm×30 mm (cross-section)×64 mm (length).

The dimension of the structure body 16a was 20 mm×163 mm (cross-section)×40 mm (length), similar to the structure body 16 of Example 1 shown in FIG. 1.

The length d of the structure body 16a was 0.04 m, and the cross-sectional area $S_2$ was 0.00326 m². The distance p was 0 cm.

For Example 3 of the soundproof structure body 11 of the present invention, the transmission loss parameter X(f) was calculated and obtained by using the above Expression (2) at the frequencies from 100 Hz to 2000 Hz, and a theoretical value (theoretically calculated value) of the transmission loss of the soundproof structure body was calculated according to the following Expression (6).

$$TL = 10 \log_{10}(X(f)) \quad (6)$$

Figure 17:
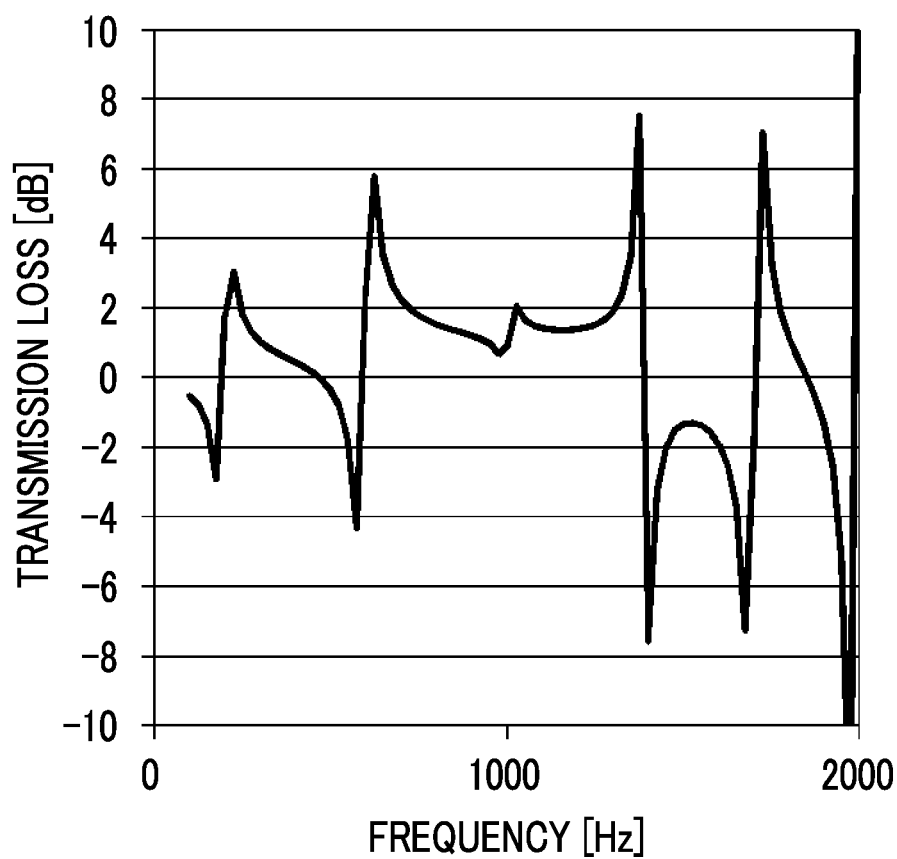
FIG. 17 is a graph showing a relationship between a transmission loss and a frequency of the soundproof structure body shown in FIG. 16.

The obtained theoretical values of Example 3 are shown in FIG. 17.

Values of the transmission loss parameter X(f) at frequencies of 400 Hz, 800 Hz, 1200 Hz, and 1600 Hz for Example 3 are shown in Table 1.

From the results in Table 1, in Example 3, it is clear that the transmission loss parameter X(f) was greater than 1 at the frequencies of 400 Hz, 800 Hz, and 1200 Hz which is three adjacent frequencies $f_n$ (=nc/2L), and the transmission loss TL was positive from the above Expression (6), in the same as in Examples 1 and 2.

Therefore, in Example 3, the transmission loss in a wide-band can be obtained, in the same as in Examples 1 and 2.

This result is clearly exhibited from the simulation result shown in FIG. 17.

Therefore, even though the soundproof structure body according to the embodiment of the present invention is a linear structure but not a bending structure, the transmission loss in a wide-band can be realized.

The effects of the present invention are clearly exhibited from Examples 1 to 3 described above.

As described above, the soundproof structure body according to the embodiment of the present invention has been described in detail with reference to various embodiments and examples. However, the present invention is not limited to these embodiments and examples, and various improvements or modifications may be made without departing from the gist of the present invention.

The soundproof structure body of the present invention is used as a structure that reduces sound in a wide frequency band to perform soundproofing while maintaining air permeability in tube structures having air permeability such as a duct, a muffler, and a ventilation sleeve, which allow even sound to pass together with gas, wind, or heat. The soundproof structure body of the present invention is particularly suitably applied to noisy machines.

EXPLANATION OF REFERENCES 10, 10a, 11 soundproof structure body
12 first tube structure
12a bottom surface
14, 28 second tube structure
16, 16a, 40 structure body
18, 26 tube structure body
20, 24, 30 opening end
22 outlet-side space
32 measurement chamber
34 sound source (speaker)
36 microphone
38 Helmholtz resonator
38a housing
38b cover
42 opening
44 rear space
df waveguide forward direction
b1, b2, b3 reflection wave

What is claimed is:

1. A soundproof structure body comprising:
a first tube structure; and
a second tube structure connected to the first tube structure and having a cross-sectional area different from the first tube structure,
wherein a direction from the second tube structure toward the first tube structure is set to a waveguide forward direction,
the first tube structure and the second tube structure are bent and connected to each other,
a structure body having a cross-sectional area smaller than a cross-sectional area of the first tube structure is installed in the first tube structure, and assuming that there are three or more consecutive frequencies forming a stable air column resonance mode in the first tube structure, three consecutive frequencies of the three or more consecutive frequencies are denoted by $f_i$, $f_{i+1}$, and $f_{i+2}$, where i is integer, an intermediate frequency between first two adjacent frequencies $f_i$ and $f_{i+1}$ is denoted by $f_n$, where n is integer, an intermediate frequency between next two adjacent frequencies $f_{i+1}$ and $f_{i+2}$ is denoted by $f_{n+1}$, a transmission loss in a case where the structure body is installed in the first tube structure with respect to a case where the structure body is not installed in the first tube structure is positive at the frequencies $f_n$ and $f_{n+1}$.

2. The soundproof structure body according to claim 1, wherein
the second tube structure is connected to an end of the first tube structure.

3. The soundproof structure body according to claim 1, wherein
the first tube structure and the second tube structure are connected to each other at a right angle.

4. The soundproof structure body according to claim 1, wherein
the outlet-side space of the first tube structure in the waveguide forward direction is an open space.

5. The soundproof structure body according to claim 1, wherein
the structure body is a resonator for a sound wave.

6. The soundproof structure body according to claim 5, wherein
the resonator is an air column resonance cylinder, a Helmholtz resonator, or a film vibration type structure body.

7. The soundproof structure body according to claim 1, wherein
the structure body is disposed on a part of an inner surface of the first tube structure.

8. The soundproof structure body according to claim 1, wherein
the structure body is disposed on a bottom surface of the first tube structure.

9. The soundproof structure body according to claim 1, wherein
the structure body has a rectangular parallelepiped.

10. A soundproof structure body comprising:
a first tube structure; and
a second tube structure connected to the first tube structure and having a cross-sectional area different from the first tube structure,
wherein a direction from the second tube structure toward the first tube structure is set to a waveguide forward direction,
the first tube structure and the second tube structure are bent and connected to each other,
a structure body having a cross-sectional area smaller than a cross-sectional area of the first tube structure is installed in the first tube structure,
the structure body is disposed on a part of an inner surface of the first tube structure, and
assuming that there are three or more consecutive frequencies forming a stable air column resonance mode in the first tube structure, three consecutive frequencies of the three or more consecutive frequencies are denoted by $f_i$, $f_{i+1}$, and $f_{i+2}$, where i is integer, an intermediate frequency between first two adjacent frequencies $f_i$ and $f_{i+1}$ is denoted by $f_n$, where n is integer, an intermediate frequency between next two adjacent frequencies $f_i$ and $f_{i+2}$ is denoted by $f_{n+1}$, a transmission loss in a case where the structure body is installed in the first tube structure with respect to a case where the structure body is not installed in the first tube structure is positive at the frequencies $f_n$ and $f_{n+1}$;

a cross-sectional area of the second tube structure is smaller than the cross-sectional area of the first tube structure, and assuming that a length of the first tube structure is denoted by L, a cross-sectional area of the first tube structure is denoted by $S_1$, a cross-sectional area of an outlet-side space of the first tube structure in the waveguide forward direction is denoted by $S_{out}$, a length of the structure body is denoted by d, a cross-sectional area of a surface perpendicular to the waveguide forward direction is denoted by $S_2$, and a distance from an outlet-side opening end of the first tube structure in the waveguide forward direction to an installation position of the structure body is denoted by p, assuming that in a bonding portion side between the first tube structure and the second tube structure, a cross-sectional area of a surface that reflects a sound wave traveling in a direction opposite to the waveguide forward direction of the first tube structure and that is perpendicular to the waveguide forward direction is denoted by $S_d$, a sound velocity is denoted by c, and n is integer, and assuming that a frequency f at which the length L of the first tube structure corresponds to $L=n\lambda/2$ is denoted by $f_n$, and $f_n = nc/2L$, a frequency at which the following Expression (1) is satisfied exists, $$X(f_n) > 1 \text{ AND } X(f_{n+1}) > 1 \tag{1}$$

where, X(f) is represented by the following Expressions (2) to (4)

$$X(f) = \frac{\left|A(f) + \dfrac{S_{out}B(f)}{\rho c} + \dfrac{\rho c C(f)}{S_1 - S_d + dS} + \dfrac{S_{out}}{S_1 - S_d + dS}D(f)\right|^2}{\left|A_0(f) + \dfrac{S_{out}B_0(f)}{\rho c} + \dfrac{\rho c C_0(f)}{S_1 - S_d + dS} + \dfrac{S_{out}}{S_1 - S_d + dS}D_0(f)\right|^2} \tag{2}$$

$$\begin{bmatrix} A_0(f) & B_0(f) \\ C_0(f) & D_0(f) \end{bmatrix} = T_0 \tag{3}$$

$$T_0 = \begin{bmatrix} \cos kL & j\dfrac{\rho c}{S_1}\sin kL \\ j\dfrac{S_1}{\rho c}\sin kL & \cos kL \end{bmatrix}$$

$$\begin{bmatrix} A(f) & B(f) \\ C(f) & D(f) \end{bmatrix} = T_1 T_2 T_3 \tag{4}$$

$$T_1 = \begin{bmatrix} \cos k(L-d-p) & j\dfrac{\rho c}{S_1}\sin k(L-d-p) \\ j\dfrac{S_1}{\rho c}\sin k(L-d-p) & \cos k(L-d-p) \end{bmatrix}$$

$$T_2 = \begin{bmatrix} \cos kd & j\dfrac{\rho c}{S_1 - S_2}\sin kd \\ j\dfrac{S_1 - S_2}{\rho c}\sin kd & \cos kd \end{bmatrix}$$

$$T_3 = \begin{bmatrix} \cos kp & j\dfrac{\rho c}{S_1}\sin kp \\ j\dfrac{S_1}{\rho c}\sin kp & \cos kp \end{bmatrix}$$

where, dS is $0.01 \times S_1$ where, p is air density, k is $2\pi f/c$ in terms of the wave number, and j represents an imaginary number.

11. The soundproof structure body according to claim 10, wherein
assuming that a longest line segment length of line segments constituting an outer edge of the cross-section of the first tube structure is denoted by a, the frequency $f_{n+1}$ at which the length L of the first tube structure corresponds to $L=(n+1) \lambda/2$ satisfies $f_{n+1} < c/a$.

12. The soundproof structure body according to claim 10, wherein the following Expression (5) is further satisfied:

$$X(f_{n+2}) > 1 \qquad (5).$$

13. The soundproof structure body according to claim 10, wherein
assuming that the transmission loss is denoted by TL, TL is represented by the following Expression (6):

$$TL = 10 \log_{10}(X(f)) \qquad (6).$$

14. The soundproof structure body according to claim 10, wherein
a ratio $S_{out}/S_1$ of the cross-sectional area $S_{out}$ of the outlet-side space to the cross-sectional area $S_1$ of the first tube structure is greater than 10.

15. The soundproof structure body according to claim 10, wherein
the first tube structure and the second tube structure are bent and connected to each other.

16. The soundproof structure body according to claim 10, wherein
the structure body is disposed on a bottom surface of the first tube structure.

17. The soundproof structure body according to claim 10, wherein
the structure body has a rectangular parallelepiped.

* * * * *